(12) United States Patent
Parker

(10) Patent No.: US 9,652,440 B2
(45) Date of Patent: May 16, 2017

(54) CONCURRENT UTILIZATION OF A DOCUMENT BY MULTIPLE THREADS

(75) Inventor: Charles W. Parker, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 125 days.

(21) Appl. No.: 12/788,804

(22) Filed: May 27, 2010

(65) Prior Publication Data

US 2011/0296299 A1 Dec. 1, 2011

(51) Int. Cl.
| G06F 17/24 | (2006.01) |
| G06F 17/22 | (2006.01) |
| G06Q 10/10 | (2012.01) |
| G06F 17/27 | (2006.01) |

(52) U.S. Cl.
CPC ...... *G06F 17/2247* (2013.01); *G06F 17/2288* (2013.01); *G06F 17/24* (2013.01); *G06F 17/241* (2013.01); *G06F 17/273* (2013.01); *G06Q 10/101* (2013.01)

(58) Field of Classification Search
CPC ............. G06F 17/2247; G06F 17/2288; G06F 17/273; G06F 17/24; G06F 17/241; G06Q 10/101
USPC .................................................. 715/255–256
See application file for complete search history.

(56) References Cited

U.S. PATENT DOCUMENTS

| 4,190,847 A |   | 2/1980 | Stenudd |
| 5,495,609 A | * | 2/1996 | Scott ............................. 707/696 |
| 5,832,263 A | * | 11/1998 | Hansen ............. G06F 17/30188 |
|             |   |         | 707/999.2 |
| 6,965,892 B1 |   | 11/2005 | Uceda-Sosa et al. ............ 707/8 |
| 7,120,622 B2 |   | 10/2006 | Zellweger et al. ............... 707/1 |
| 7,164,676 B1 |   | 1/2007 | Chakraborty ................. 370/368 |
| 7,533,149 B2 |   | 5/2009 | Starbuck et al. |
| 7,769,810 B1 | * | 8/2010 | Kaufman ...................... 715/753 |

(Continued)

FOREIGN PATENT DOCUMENTS

| EP | 1320007 A1 | 6/2003 |
| WO | 9712328 A1 | 4/1997 |

OTHER PUBLICATIONS

Colin Blundell et al., Deconstructing Transactional Semantics: The Subtleties of Atomicity, Department of Computer and Information Science, University of Pennsylvania, Jun. 2005, http://www.elewis.net/papers/wddd05.pdf, 7 pages.

(Continued)

*Primary Examiner* — Chau Nguyen
(74) *Attorney, Agent, or Firm* — Steven F. Owens

(57) ABSTRACT

A computing system concurrently executes a builder thread and a reader thread. The builder thread modifies a document by modifying an active representation of the document. The reader thread perform operations regarding the document using a non-active representation of the document. The active representation of the document and the non-active representation of the document are stored in a memory of the computing system. The active representation of the document and the non-active representation of the document do not include different copies in the memory of the same data. When reading data in the non-active representation of the document, logical consistency is ensured without locking any data in the non-active representation of the document.

20 Claims, 20 Drawing Sheets

(56) References Cited

U.S. PATENT DOCUMENTS

| | | | |
|---|---|---|---|
| 7,774,703 B2* | 8/2010 | Junuzovic | G06F 3/0481 715/229 |
| 8,555,161 B2 | 10/2013 | Parker | |
| 2002/0087596 A1 | 7/2002 | Lewontin | |
| 2003/0212712 A1 | 11/2003 | Gu et al. | |
| 2004/0172424 A1* | 9/2004 | Edelstein | G06F 17/30067 |
| 2004/0260734 A1 | 12/2004 | Ren et al. | |
| 2005/0060055 A1 | 3/2005 | Hallowell et al. | |
| 2005/0262432 A1* | 11/2005 | Wagner | 715/511 |
| 2005/0278780 A1 | 12/2005 | Krishna | |
| 2006/0238795 A1* | 10/2006 | Van Hoof | 358/1.14 |
| 2007/0198979 A1 | 8/2007 | Dice et al. | 718/100 |
| 2008/0040181 A1 | 2/2008 | Freire et al. | |
| 2009/0106247 A1* | 4/2009 | Daughtry et al. | 707/8 |
| 2009/0112937 A1* | 4/2009 | Campbell | G06F 17/246 |
| 2009/0125518 A1* | 5/2009 | Bailor | G06F 17/24 |
| 2010/0070562 A1* | 3/2010 | Boyer et al. | 709/203 |
| 2010/0070721 A1 | 3/2010 | Pugh et al. | |
| 2010/0094912 A1* | 4/2010 | Curtis | G06Q 10/10 707/803 |
| 2010/0318511 A1* | 12/2010 | Phan et al. | 707/722 |
| 2011/0296300 A1 | 12/2011 | Parker | |

OTHER PUBLICATIONS

Jeewoong Ryu et al., MPEG-7 Metadata Authoring Tool, Published 2002, http://vega.icu.ac.kr/~mccb-labpublications/Paper/Ryu_ACM_Multimedia2002.pdf, 4 pages.

Chandrasekhar Boyapati et al., Ownership Types for Safe Programming: Preventing Data Races and Deadlocks, Published 2002, http://www.eecs.umich.edu/~bchandra/publications/oopsla02.pdf, 20 pages.

Hyun Sung Chang et al., Efficient Video Indexing Scheme for Content-Based Retrieval, Published 1999, http://web.mit.edu/hyunsung/www/papers/1999/tcsvt99.pdf, 11 pages.

Driscoll et al., "Making Data Structures Persistent", Journal of Computer and System Sciences, vol. 38, No. 1, pp. 86-124 (Feb. 1989).

Glasser-Karger; "Persistent Data Structures" from 6.854 Advance Algorithms Lecture 2, 6 pages (Sep. 8, 2006).

International Search Report and Written Opinion cited in International Application No. PCT/US2011/036698 mailed Feb. 9, 2012.

Meyers, "An O(ND) Difference Algorithm and Its Variations," published in the Journal Algorithmica, vol. 1, pp. 251-266 (1986).

Mohamed et al., "Versioning Tree Structures by Path-Merging," FAW 2008, pp. 101-112 (2008).

Planar Point Location, accessed at: http://wwwisg.cs.uni-magdeburg.de/ag/lehre/SS2009/GDS/slides/S13.pdf; accessed on Jul. 20, 2010, 28 pages.

Zhuang, B., "Advanced Data Structures Lecture-7," 10 pages (Dec. 14, 2009).

Office Action mailed Aug. 8, 2012, in co-pending U.S. Appl. No. 12/916,140.

Notice of Allowance mailed Jun. 3, 2013, in co-pending U.S. Appl. No. 12/916,140.

Office Action mailed Mar. 22, 2013, in co-pending U.S. Appl. No. 12/916,140.

"First Office Action Issued in Chinese Patent Application No. 201180025941.5", Mailed Date: Jan. 23, 2015, 14 pages.

"Second Office Action and Search Report Issued in Chinese Patent Application No. 201180025941.5", Mailed Date: Aug. 21, 2015, 14 Pages.

"Office Action Issued in Russian Patent Application No. 2012150507", Mailed Date: Jul. 21, 2015, 5 Pages. (W/o English Translation).

McFedries, Paul, "Excel for Windows 95", Jul. 31, 1997, 186-187. (W/o English Translation).

"Notice of Allowance Issued in Russian Patent Application No. 2012150507", Mailed Date: Nov. 17, 2015, 22 Pages.

"Third Office Action Issued in Chinese Patent Application No. 201180025941.5", Mailed Date: Jan. 26, 2016, 11 Pages.

"Fourth Office Action Issued in Chinese Patent Application No. 201180025941.5", Mailed Date: Jul. 14, 2016, 13 Pages.

"Notice of Allowance Issued in Chinese Patent Application No. 201180025941.5", Mailed Date: Dec. 16, 2016, 4 Pages.

\* cited by examiner

CONCURRENT UTILIZATION OF A DOCUMENT BY MULTIPLE THREADS

BACKGROUND

Electronic documents are ubiquitous in today's work environment. For example, millions of people use and generate word processor documents, spreadsheet documents, and other sorts of documents every day. With the increasing importance of electronic documents, people have come to expect software applications to provide ever more powerful tools for manipulating electronic documents. For example, people have come to expect word processing applications to provide accurate grammar and spell checking tools.

However, such tools are frequently computationally intensive. Because such tools are computationally intensive, the use of such tools can result in delays that are noticeable to users. Such delays can cause user frustration and should therefore be minimized.

In recent years, the performance of computers has increased. However, much of that increase is due to the fact that individual computers can now use multiple processing units. For example, older computers only had a single processing unit and therefore could only execute one program at a time. Newer computers can have multiple processing units and therefore can execute multiple programs at the same time.

In some circumstances, multiple programs executing on multiple processing units need to interact with the same data in an electronic document. For example, if a first program were to write to some data in an electronic document while a second program was trying to read that data, the second program could read corrupted data. A typical solution to this problem is for programs to lock data in the electronic document before the programs read the data. When a program locks data, no other program can write to the data. Therefore, if another thread wants to write to the data while the data is locked, the other thread is forced to wait until the data is unlocked. Forcing the other thread to wait can result in delays that are noticeable to users.

SUMMARY

A computing system concurrently executes a builder thread and at least one reader thread. The builder thread modifies a document by modifying an active representation of the document. The reader thread performs operations regarding the document using a non-active representation of the document. The active representation of the document and the non-active representation of the document are stored in a memory of the computing system. The active representation of the document and the non-active representation of the document do not include different copies in the memory of the same data. When reading data in any non-active representation of the document, logical consistency is ensured without locking any data in any non-active representation of the document.

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
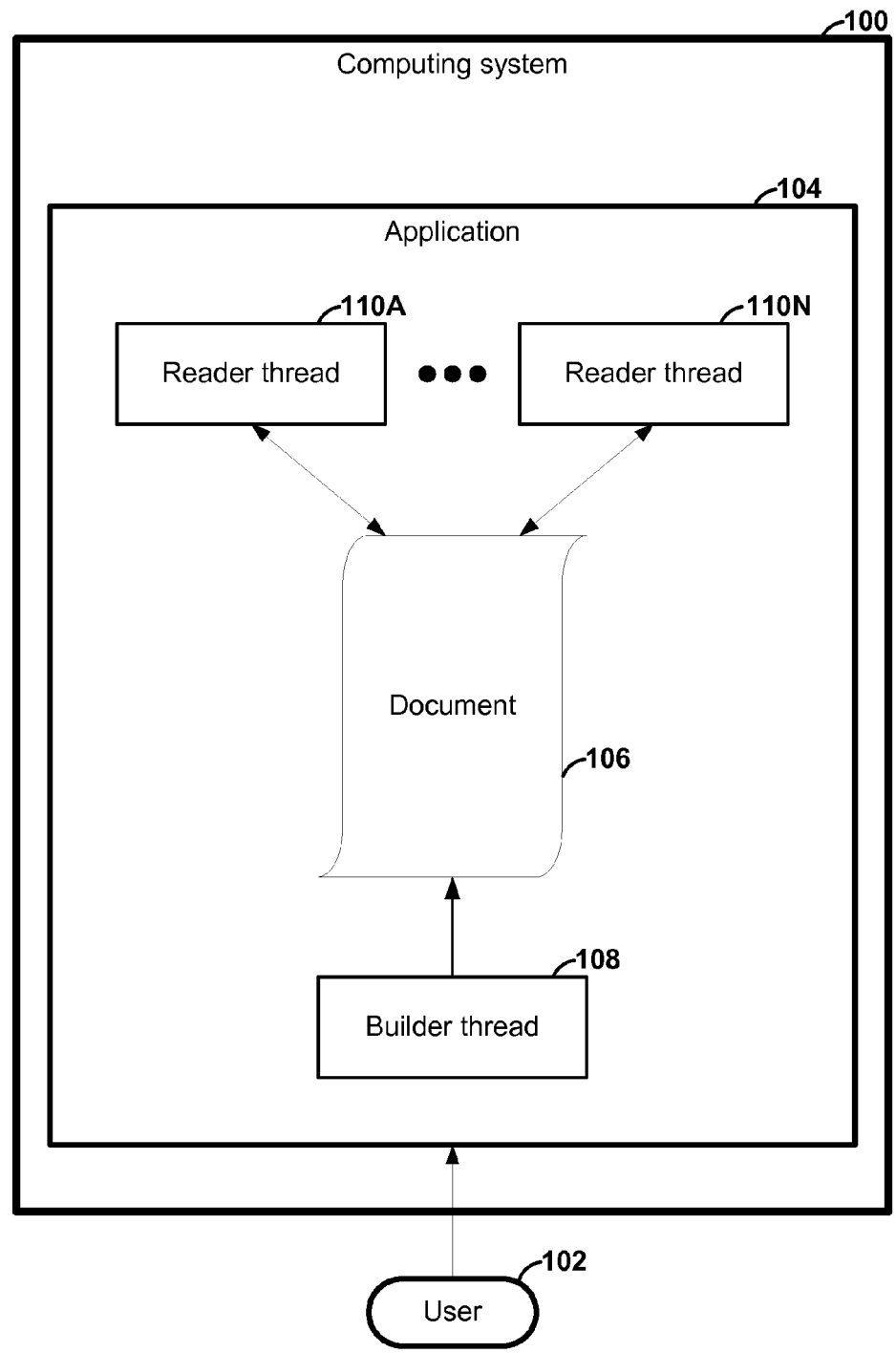
FIG. 1 is a block diagram illustrating an example computing system.

FIG. 1 is a block diagram illustrating an example computing system 100. As illustrated in the example of FIG. 1, a user 102 uses the computing system 100 to access an application 104. The application 104 allows the user 102 to interact with a document 106. In various embodiments, the application 104 can be various types of applications. For example, the application 104 can be the MICROSOFT® WORD® word processing application, the MICROSOFT® OUTLOOK® communication system, the MICROSOFT® EXCEL® spreadsheet application, the MICROSOFT® ONENOTE® note taking application, or other types of word processing applications, communication/email applications, spreadsheet applications, note taking applications, or other types of applications that allow users to interact with documents. Accordingly, the document 106 can be various types of documents. For example, the document 106 can be a word processor document, a web page, an e-mail message, a spreadsheet document, or another type of document. In various embodiments, the user 102 can interact with the document 106 in various ways. For example, in some embodiments, the user 102 can view or edit content in the document 106.

To display the document 106 to the user 102, the application 104 translates an internal representation of the document 106 into the document shown to the user 102. For example, the representation of the document 106 can include a great deal of data that instructs the application 104 how to display the document 106. The application 104 interprets this data to display the document 106 to the user 102. However, this data is not generally displayed to the user 102.

The application 104 uses a plurality of threads executed by the computing system 100 to enable the user 102 to interact with the document 106. A thread is a part of a program that can execute independently of other parts of the program. The threads used by the application 104 can execute concurrently on different processing units of the computing system 100. Consequently, two or more of the threads can try to access the same data in the representation of the document 106 at the same time. It is not desirable for two or more of the threads to access the same data at the same time because unexpected results can occur. For example, when the user 102 provides input to the computing system 100 to replace an old word (e.g., "tiger") in the document 106 with a new word (e.g., "leopard"), one thread updates the appropriate data in the representation of the document 106 to replace the old word with the new word. At the same time, another thread is spellchecking the document. If the spellchecking thread reads in the appropriate data while the updating thread is updating the appropriate data, the spellchecking thread could read in data representing some of the new word (e.g., "leop") and data representing some of the old word (e.g., "ger"). The spellchecking thread could see the word as "leopger" and indicate that the new word is spelled wrong, even though the new word "leopard" is spelled correctly and appears correctly to the user 102. This is not logically consistent.

To avoid this situation, the application 104 uses multiple representations of the document 106. As illustrated in the example of FIG. 1, the threads include a builder thread 108. As described elsewhere in this specification, the builder thread 108 modifies the document 106 by modifying an active representation of the document 106. The active representation of the document 106 is stored in a memory of the computing system 100. After the builder thread 108 finishes modifying the active representation of the document 106, the active representation of the document 106 becomes a non-active representation of the document 106.

In addition to the builder thread 108, the application 104 uses one or more reader threads 110A through 110N (collectively, "reader threads 110"). The reader threads 110 perform operations regarding the document 106 using one or more non-active representations of the document 106. Such operations help the application 104 provide various types of functionality. For example, the document 106 can be a word processing document, such as a MICROSOFT® WORD® document. In this example, one of reader threads 110 performs a spellchecking operation on the text in the document 106. In another example, one of the reader threads 110 gets the document 106 ready for printing. In yet another example, one of the reader threads 110 saves the document 106 out to a local or remote data storage system. In yet another example, one of the reader threads 110 uses a non-active representation of the document 106 to display the document 106 to the user 102. In yet another example, one of the reader threads 110 repaginates the document 106 as the user 102 types data into the document 106. In yet another example, one of the reader threads 110 identifies places to insert hyphens when words span multiple rows.

The builder thread 108 is the only thread that modifies data in any representation of the document 106. That is, the reader threads 110 do not modify the active representation of the document 106 or any non-active representation of the document 106. Rather, the reader threads 110 can instruct the builder thread 108 to modify the document 106. The builder thread 108 does not modify any data in any non-active representation of the document 106.

After the builder thread 108 finishes an operation to modify the active representation of the document 106, the active representation of the document 106 becomes a non-active representation of the document 106. This non-active representation of the document 106 is available for use by the reader threads 110. To modify the document 106 again, the builder thread 108 generates a new active representation of the document 106, modifies that new active representation of the document 106, and makes this new active representation of the document 106 into a non-active representation of the document 106.

Because no thread modifies any non-active representation of the document 106, when the reader threads 110 read data in a non-active representation of the document 106, logical consistency is ensured without locking any data in the non-active representation of the document 106. In other words, there is no danger that another concurrently executing thread could write to data while one of the reader threads 110 is trying to read that same data.

Generating completely separate representations of the document 106 each time the document 106 is modified could consume an enormous amount of space in the memory of the computing system 100. Furthermore, generating completely separate representations of the document each time the document 106 is modified could be computationally intensive. Consequently, the active representation of the document 106 and the non-active representations of the document 106 do not include different copies in memory of the same data. For example, the active representation of the document 106 and a non-active representation of the document 106 can both include data that represents a same part of the document 106. In this example, there are not two separate copies in memory of that data. Rather, both the active representation of the document 106 and the non-active representations of the document 106 refer to the same copy of that data in memory.

Figure 2:
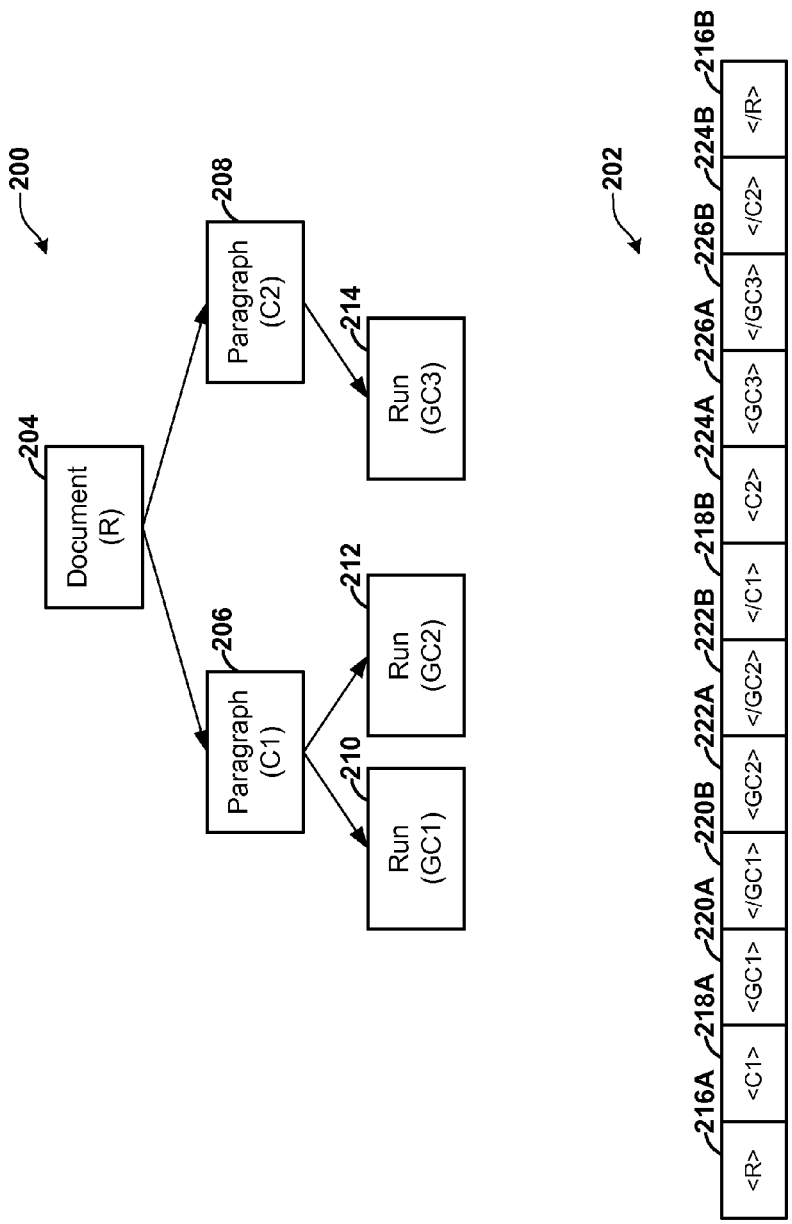
FIG. 2 illustrates an example document tree and an element array that represents the document tree.

FIG. 2 illustrates an example document tree 200 and an element array 202. Internally, the document 106 is represented as a document tree, such as the document tree 200. The document tree 200 is a hierarchy of document elements. These document elements are not typically displayed to the user 102, but rather are used by the application 104 to determine how to the display the document 106 to the user 102.

The document elements in the document tree 200 include elements that represent structures within the document 106. For instance, in the example of FIG. 2, the document tree 200 includes a document element 204 that represents the document 106 as a whole. In this example, the document tree 200 includes a document element 206 and a document element 208 that represent paragraphs within the document 106. Because the document element 206 (i.e., a paragraph) and the document element 208 (i.e., another paragraph) represent things within the document 106, the document element 206 and the document element 208 are below the document element 204 in the document tree 200.

Furthermore, in the example of FIG. 2, the document tree 200 includes a document element 210, a document element 212, and a document element 214. The document element 210 and the document element 212 represent runs of text within the paragraph represented by the document element 206. For example, the document elements 210 and 212 can represent sentences in the paragraph represented by the document element 206. Because the document element 210 and the document element 212 represent things within the paragraph represented by the document element 206, the document element 210 and the document element 212 are below the document element 206 in the document tree 200. The document element 214 represents a run of text within the paragraph represented by the document element 208. Because the document element 214 represents a thing within the paragraph represented by the document element 208, the document element 214 is below the document element 208 in the document tree 200.

The document elements in the document tree 200 can have various attributes. In the example of FIG. 2, the document element 204 can include an attribute that sets "Times New Roman" as a default font for the document 106. In this example, the document element 208 can include an attribute that overrides the default font and sets "Arial" as the font for paragraph represented by the document element 208. Furthermore, in this example, the document element 214 can include an attribute that makes the run of text represented by the document element 214 underlined.

Conceptually, computer memory is like a row of slots. Each of the slots in the row has a different address. For example, one slot in the row can have the address "37" and the next slot in the row can have the address "38," and so on. Each of the slots can store data. Because computer memory is like a row of slots, computer memory is conceptually a one-dimensional structure. In contrast, the document tree 200 is a two-dimensional structure (i.e., the document tree 200 has a height and width). To store the document tree 200 (a two-dimensional structure) in computer memory (a one-dimensional structure), it is necessary to represent the document tree 200 as a one-dimensional structure.

The element array 202 is an example one-dimensional structure that represents the document tree 200. The element array 202 comprises elements 216A, 216B, 218A, 218B, 220A, 220B, 222A, 222B, 224A, 224B, 226A, and 226B. The elements 216A and 216B correspond to the document element 204 in the document tree 200. The element 216A is an open element and the element 216B is a close element corresponding to the element 216A. Elements in an array between an open element and a corresponding close element represent document elements below the document element represented by the open element and the corresponding close element.

The elements in the element array 202 between the elements 216A and 216B correspond to document elements in the document tree 200 below the document element 204. The elements 218A and 218B correspond to the document element 206 in the document tree 200. Elements in the element array 202 between the elements 218A and 218B correspond to document elements in the document tree 200 below the document element 206. The elements 220A and 220B correspond to the document element 210 in the document tree 200. Because there are no document elements in the document tree 200 below the document element 210, there are no elements in the element array 202 between the elements 220A and 220B. The elements 222A and 222B correspond to the document element 212 in the document tree 200. Because there are no document elements in the document tree 200 below the document element 210, there are no elements in the element array 202 between the elements 222A and 222B. The elements 224A and 224B correspond to the document element 208 in the document tree 200. Elements in the element array 202 between the elements 224A and 224B correspond to document elements in the document tree 200 below the document element 208. The elements 226A and 226B correspond to the document element 214 in the document tree 200. Because there are no document elements in the document tree 200 below the document element 214, there are no elements in the element array 202 between the elements 226A and 226B.

As the user 102 works with the document 106, the user 102 may want to add a new paragraph between the paragraph represented by the document element 206 and the paragraph represented by the document element 208. Consequently, the document tree 200 would be updated to include a new document element below the document element 204. The new document element represents the new paragraph. To represent the updated document tree 200, a new pair of elements would need to be added between the elements 218B and 224A in the element array 202. The new pair of elements corresponds to the new document element.

As mentioned previously, computer memory is conceptually a row of slots. Data representing the element array 202 are stored in such slots in computer memory. To insert new elements between two elements in the element array 202, the builder thread 108 could free up slots for the new elements by copying all elements in the element array 202 following the new elements into slots further down the row of slots, and then storing the new elements into the freed up slots. For example, the element 218B can be stored at slot "37," the element 224A can be stored at slot "38," the element 226A can be stored at slot "39," the element 226B can be stored at slot "40," the element 224B can be stored at slot "41", and the element 216B can be stored at slot "41." In this example, to insert elements between the element 218B and the element 224A, the computing system 100 could copy the element 216B to slot "43," the element 224B to slot "42," the element 226B to slot "41," the element 226A to slot "40," and the element 224A to slot "39." In this example, the builder thread 108 could then store the new elements in slots "37" and "38." As this example demonstrates, if the builder thread 108 were to use this approach, the builder thread 108 might have to perform a large number of copy operations to insert elements into the element array 202. Similarly, if the builder thread 108 were to shift the elements in the element array 202 when elements are deleted from the element array 202, the builder thread 108 might have to perform a large number of copy operations to delete elements from the element array 202.

Rather than copying elements when a new element is inserted into the element array 202, the builder thread 108 adds the new element to one end of a real element array. Consequently, the elements in the real element array are not necessarily ordered such that elements corresponding to a document element below another document element are between the elements corresponding to the other document element. As described in this specification, a representation of the document 106 comprises an index tree, a piece descriptor table, and such a real element array. The index tree and the piece descriptor table indicate where elements in the real element array belong in a virtual element array. The virtual element array is a one-dimensional representation of the document tree 200. Elements in the virtual element array are ordered such that elements corresponding to a document element below another document element are between the elements corresponding to the other document element.

Figure 3:
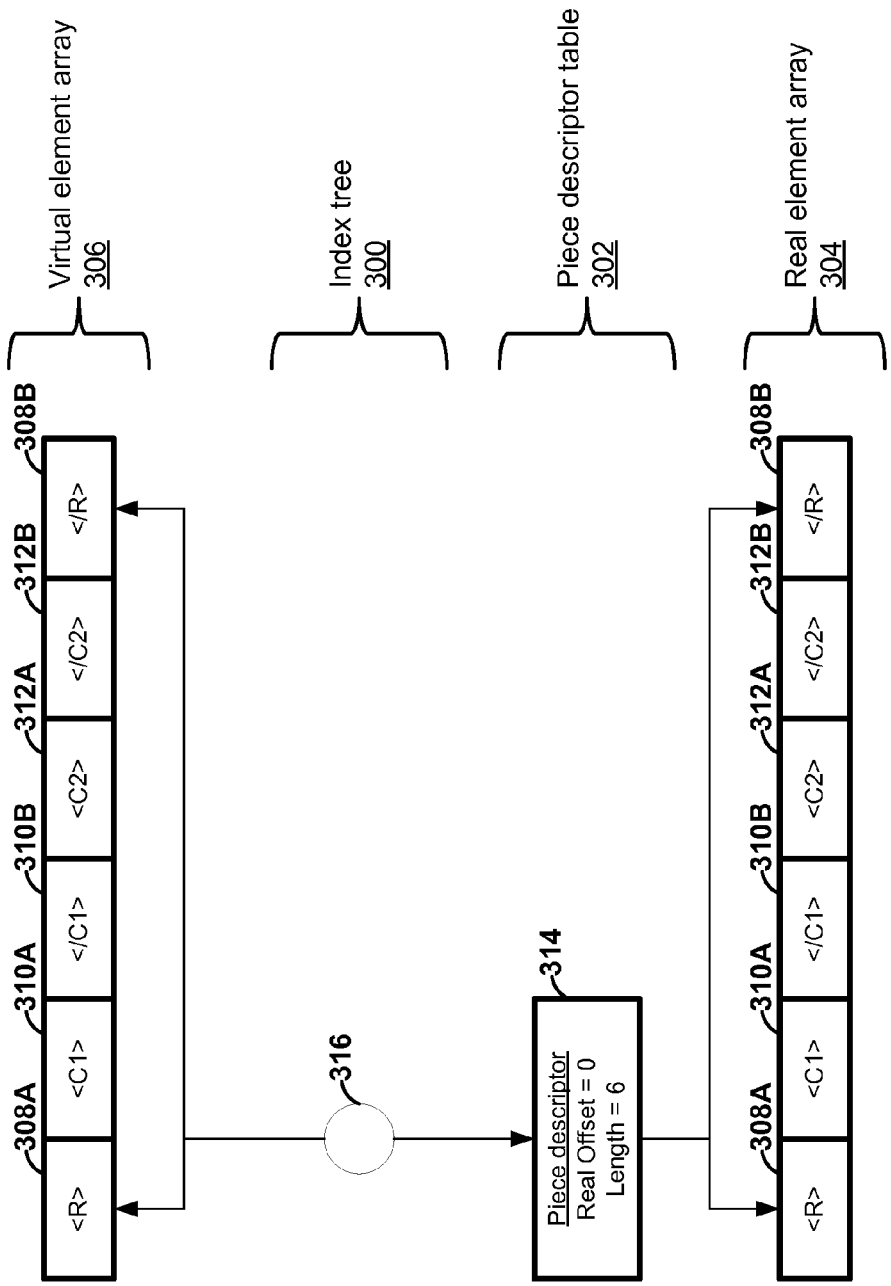
FIG. 3 illustrates an example representation of a document.

FIG. 3 is a block diagram illustrating an example representation of the document 106. The representation of the document 106 includes an index tree 300, a piece descriptor table 302, and a real element array 304. The index tree 300 and the piece descriptor table 302 are data structures that indicate where elements in the real element array 304 belong in a virtual element array 306.

As illustrated in the example of FIG. 3, the real element array 304 contains elements 308A, 308B, 310A, 310B, 312A, and 312B. The elements 308A, 308B, 310A, 310B, 312A, and 312B correspond to each document element in a document tree of the document 106. For each given element in the virtual element array 306, if the given element is between an open element and a close element in the virtual element array 306, the given element represents a document element in the document tree that is below a document element in the document tree represented by the open element and the close element. The virtual element array 306 also contains the elements 308A, 308B, 310A, 310B, 312A, and 312B. However, the virtual element array 306 does not actually exist in computer memory.

In some embodiments, such as that illustrated in the example of FIG. 3, elements in the real element array 304 are properly ordered when the application 104 initially loads the document 106. In other words, each element in the real element array 304 corresponding to a document element below another document element is between the elements corresponding to the other document element. Consequently, when the application 104 initially loads the document 106, the real element array 304 can be the same as the virtual element array 306.

The piece descriptor table 302 contains a set of one or more piece descriptors. Each of the piece descriptors in the piece descriptor table 302 is a data structure that identifies a different piece of the real element array 304. A piece of the real element array 304 is a set of one or more consecutive elements in the real element array 304. For example, elements 308A, 310A, and 310B could be a piece of the real element array 304 and elements 312B and 308B could be another piece of the real element array 304.

In various embodiments, the piece descriptors are implemented in various ways. For example, in some embodiments, the piece descriptors specify a real offset of a leftmost element of a piece and a real offset of a rightmost element of the piece. In this specification, an element in an array is said to be to the left of another element in the array when the element is closer to the start of the array than the other element. Similarly, an element in an array is said to be to the right of another element in the array when the element is further from the start of the array than the other element. In other embodiments, piece descriptors are implemented as data structures having a real offset attribute and a length attribute. A real offset of an element indicates a distance from the beginning of the real element array 304 to the element. A real offset attribute of a piece descriptor indicates a real offset of a leftmost element in a piece. The length attribute of a piece descriptor indicates a length of the piece. This implementation of piece descriptors is used throughout this specification. However, it should be understood that in other embodiments, other implementations of piece descriptors can be used.

The real offset attribute of a piece descriptor can indicate a real offset in various ways. For example, in some embodiments, a real offset attribute can indicate a number of bytes from the beginning of the real element array 304 to the element. In other embodiments, a real offset attribute can indicate a number of elements between the beginning of the real element array 304 and an element. Embodiments where the real offset attribute indicates a number of elements are described throughout this specification. However, it should be understood that in other embodiments, real offset attributes can indicate the distances from the beginning of the real element array 304 in other ways.

The length attribute of a piece descriptor can indicate a length of a piece in various ways. For instance, in some embodiments, the length attribute can indicate a number of bytes in the piece. In other embodiments, the length attribute can indicate a number of elements in the piece. Embodiments where the length attributes indicate numbers of elements are described throughout this specification. However, it should be understood that in other embodiments, length attributes can indicate the lengths of pieces in other ways.

When the computing system 100 initially loads the document 106, there is only one piece in the real element array 304. Consequently, the piece descriptor table 302 includes a single piece descriptor 314. The piece descriptor 314 has a real offset attribute of 0, thereby indicating a piece that starts at the beginning of the real element array 304. The piece descriptor 314 has a length attribute of 6 indicating that the piece is six elements long.

The index tree 300 comprises a hierarchy of one or more index nodes. Each of the index nodes in the index tree 300 corresponds to a different piece descriptor in the piece descriptor table 302. As illustrated in the example of FIG. 3, there is only a single piece descriptor 314 in the piece descriptor table 302. Consequently, the index tree 300 contains a single index node 316.

In various embodiments, the index nodes in the index tree 300 are implemented in various ways. For example, in some embodiments, the index nodes in the index tree 300 are implemented as data structures having a left child attribute, a right child attribute, and a descriptor attribute. In such embodiments, if an index node has a left child index node in the index tree 300, the left child attribute of the index node indicates the left child of the index node. If the index node has a right child index node in the index tree 300, the right child attribute of the index node indicates the right child of the index node. The descriptor attribute of an index node indicates a piece descriptor in the piece descriptor table 302. In the example of FIG. 3, the descriptor attribute of the index node 316 indicates the piece descriptor 314. Embodiments where index nodes are implemented as data structures having left child attributes, right child attributes, and descriptor attributes are described throughout this specification. However, it should be appreciated that in other embodiments, index nodes are implemented in other ways.

Figure 4:
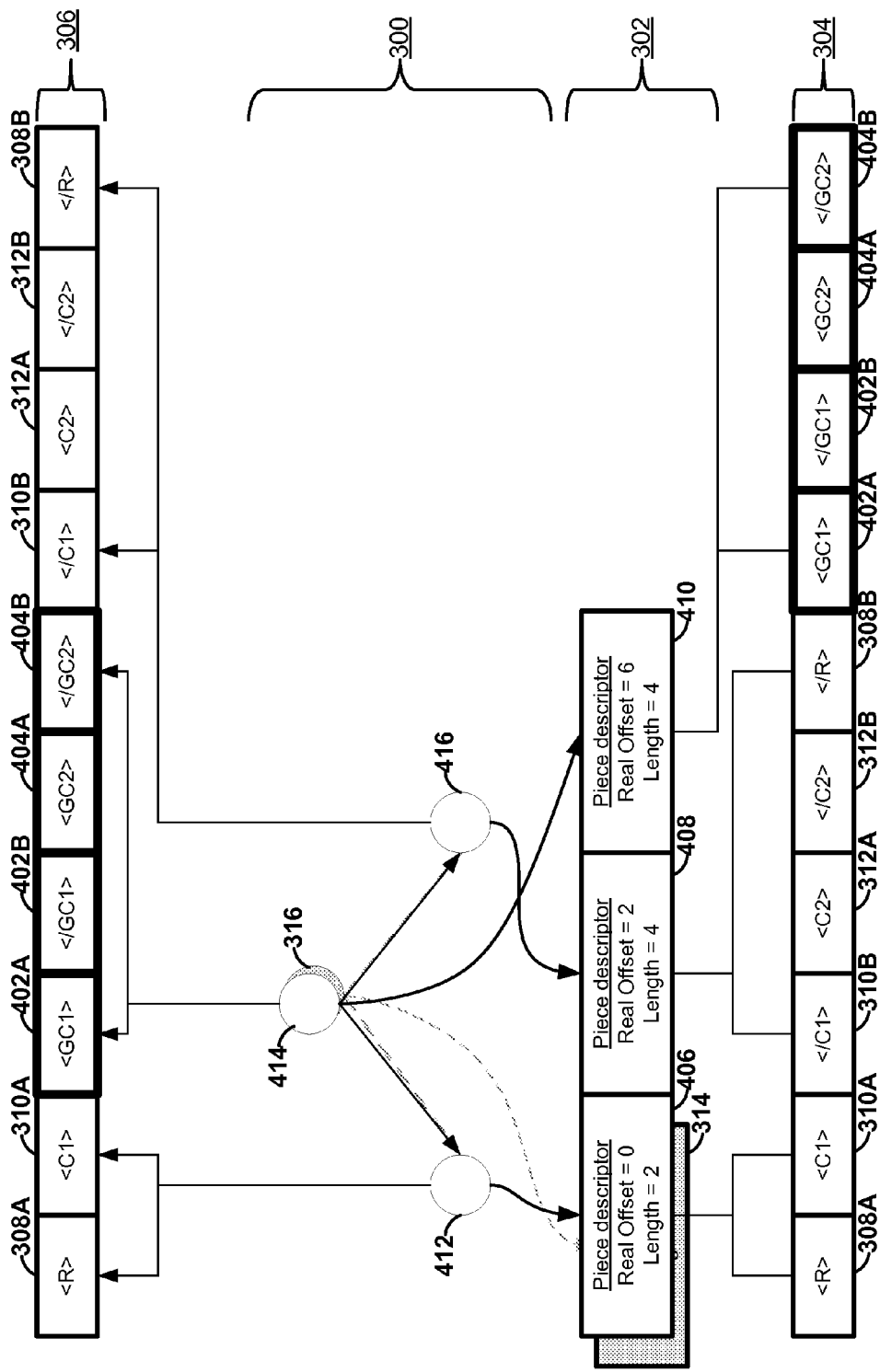
FIG. 4 illustrates the example representation of the document when elements are inserted.

FIG. 4 is a block diagram illustrating the example representation of the document 106 when elements are inserted. As illustrated in the example of FIG. 4, elements 402A, 402B, 404A, and 404B are inserted at one end of the real element array 304. The elements 402A and 402B represent a document element that is below a document element represented by the elements 310A and 310B. The elements 404A and 404B represent a document element that is below the document element represented by the elements 310A and 310B. Consequently, in the virtual element array 306, the elements 402A, 402B, 404A, and 404B are between the elements 310A and 310B.

Previously, all of the elements in the real element array 304 were properly ordered. Consequently, only a single piece descriptor 314 was needed to indicate a piece of the real element array 304 that included the elements between the elements 308A and 308B. When the elements 402A, 402B, 404A, and 404B are inserted into the real element array 304, the elements in the real element array 304 are no longer properly ordered. Instead, the elements in the real element array 304 are divided into three pieces: a piece of the real element array 304 containing elements that belong to the left of the elements 402A, 402B, 404A, and 404B (i.e., the elements 308A and 310A), a piece of the real element array 304 containing the elements 402A, 402B, 404A, and 404B, and a piece of the real element array 304 containing elements that belong to the right of the elements 402A, 402B, 404A, and 404B (i.e., elements 310B, 312A, 312B, and 308B).

It is a property of the piece descriptor table 302 that the values of attributes of piece descriptors cannot change. This property can ensure that the reader threads 110 can read data from the piece descriptors without needing to account for the possibility that the builder thread 108 can change the data in the piece descriptors while the reader threads 110 are reading data in the piece descriptors.

Because the values of attributes of piece descriptors do not change and because a piece descriptor can only indicate a single piece in the real element array 304, additional piece descriptors are needed. To add additional piece descriptors, the builder thread 108 generates a piece descriptor 406, a piece descriptor 408, and a piece descriptor 410. The piece descriptor 406, the piece descriptor 408, and the piece descriptor 410 constitute an active version of the piece table 302. The active version of the piece table 302 is part of the active representation of the document 106.

The piece descriptor 406 replaces the piece descriptor 314. However, the builder thread 108 does not immediately delete the piece descriptor 314. To the contrary, the piece descriptor 314 continues to exist as part of a non-active version of the piece table 302 in a non-active representation of the document 106. Consequently, the reader threads 110 can use the piece descriptor 314 while the builder thread 108 is performing operations on piece descriptors in the active version of the piece descriptor table 302.

The piece descriptor 406 identifies a piece of the real element array 304 containing the elements 308A and 310A. Note that the piece descriptor 406 is a clone (i.e. copy) of the piece descriptor 314, except that the length attribute of the piece descriptor 406 differs from the length attribute of the piece descriptor 314. The piece descriptor 408 identifies the piece of the real element array 304 containing the elements 310B, 312A, 312B, and 308B. The piece descriptor 410 identifies the piece of the real element array 304 containing the elements 402A, 402B, 404A, and 404B.

The index nodes in the index tree 300 can have up to two child nodes. The heights of the two subtrees of an index node in the index tree 300 differ by at most one. For example, the depth of the right subtree of an index node cannot be 3 when the depth of left subtree of the index node is 1. In another example, the depth of the right subtree of the index node can be 2, 1, or 0 when the depth of the left subtree is 1. In some embodiments, the index tree 300 is an AVL tree, a B-tree, a red-black tree, or another sort of binary tree.

The index tree 300 has a sorting property. The sorting property provides that for each index node in the index tree 300, elements associated with index nodes in the left subtree of the index node have virtual offsets less than the virtual offsets of elements associated with the index node. Furthermore, elements associated with index nodes in the right subtree of the index node have virtual offsets that are greater than the virtual offsets of the elements associated with the index node. An element is associated with an index node when the element is in a piece indicated by a piece descriptor indicated by the index node. A virtual offset of an element is a distance from the beginning of the virtual element array 306 to the position of the element in the virtual element array 306.

In addition, it is a property of the index tree 300 that the values of attributes of the index nodes cannot change. This property can ensure that the reader threads 110 can read data from the index nodes without needing to account for the possibility that the builder thread 108 can change the data in the index nodes while the reader threads 110 are reading data in the index nodes.

To maintain these properties when the elements 402A, 402B, 404A, and 404B are inserted into the real element array 304, the builder thread 108 generates the index nodes 412, 414, and 416. The index nodes 412, 414, and 416 constitute an active version of the index tree 300. The active version of the index tree 300 is part of the active representation of the document 106.

The index node 414 replaces the index node 316. However, the builder thread 108 does not immediately delete the index node 316. To the contrary, the index node 316 continues to exist as part of a non-active version of the index tree 300 included in a non-active representation of the document 106. Consequently, the reader threads 110 can use the index node 316 while the builder thread 108 is performing operations to modify the active version of the index tree 300. The index node 412 indicates the piece descriptor 406, the index node 414 indicates the piece descriptor 410, and the index node 416 indicates the piece descriptor 408.

The index node 412 is in the left subtree of the index node 414. Consequently, the index node 412 is associated with elements having virtual offsets that are less than the virtual offsets of elements associated with the index node 414. The index node 416 is in the right subtree of the index node 414. Consequently, the index node 416 is associated with elements having virtual offsets greater than the virtual offsets of the elements associated with the index node 414.

In the example of FIG. 4, the active representation of document 106 includes the active version of the index tree 300, the active version of the piece descriptor table 302 and the real element array 304. When the builder thread 108 completes the operation to insert the elements 402A, 402B, 404A, and 404B, the active version of the index tree 300 includes the index nodes 412, 414, and 416 and the active version of the piece descriptor table 302 includes the piece descriptors 406, 408, and 410. The non-active representation of the document 106 includes the non-active version of the index tree 300, the non-active version of the piece descriptor table 302, and the real element array 304. The non-active version of the index tree 300 includes just the index node 316. The non-active version of the piece descriptor table 302 just includes the piece descriptor 314.

Figure 5:
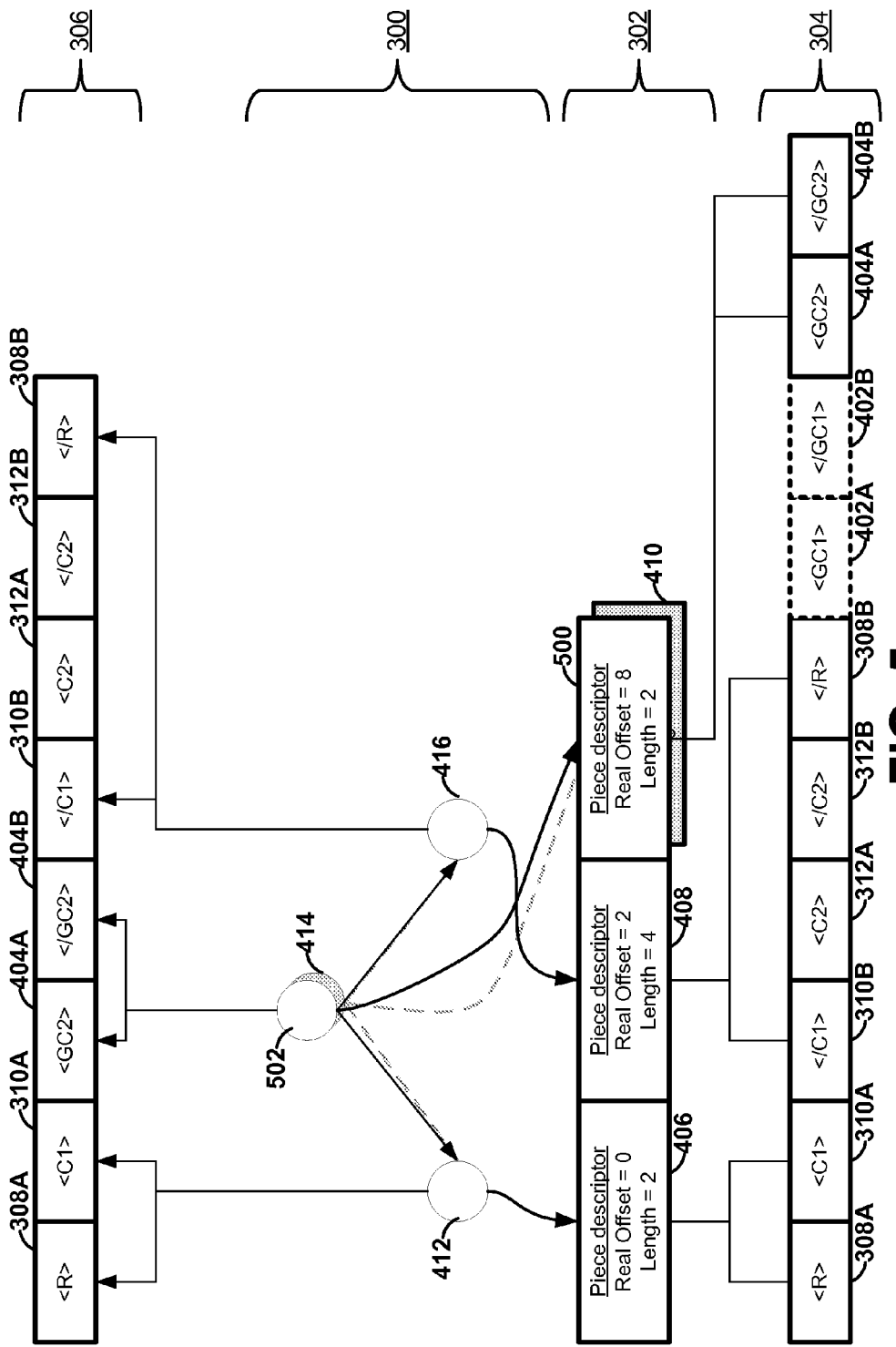
FIG. 5 illustrates the example representation of the document when elements are deleted.

FIG. 5 illustrates the example representation of the document 106 when elements are deleted. As illustrated in the example of FIG. 5, the elements 402A and 402B are deleted from the virtual element array 306. In the real element array 304, the elements following the elements 402A and 404B are not moved. That is, in the real element array 304, the element 404A is not made adjacent to the element 308B when the elements 402A and 402B are deleted from the virtual element array 306. However, in the virtual element array 306, it appears as though the elements 402A and 402B have disappeared completely.

When the elements 402A and 402B are removed, values of the real offset attribute and the length attribute of the piece descriptor 410 need to change in order to indicate that the piece does not include the elements 402A and 402B. As mentioned above, it is a property of the piece descriptor table 302 that the values of attributes of piece descriptors cannot change. Consequently, the builder thread 108 generates a piece descriptor 500. The piece descriptor 500, the piece descriptor 408, and the piece descriptor 406 constitute an active version of the piece descriptor table 302. The piece descriptor 500 replaces the piece descriptor 410. The real offset attribute and the length attribute of the piece descriptor 500 have the proper values.

Even though the builder thread 108 has generated the piece descriptor 500, the descriptor attribute of the index node 414 still indicates the piece descriptor 410. As mentioned above, it is a property of the index tree 300 that the values of attributes of the index nodes cannot change. Consequently, the builder thread 108 generates a new index node 502. The index nodes 502, 412, and 416 constitute an active version of the index tree 300. The index node 502 replaces the index node 414. The descriptor attribute of the index node 502 indicates the piece descriptor 500. The builder thread 108 does not immediately delete the index node 414. This allows the reader threads 110 to continue using the index node 414 and the piece descriptor 410 while the builder thread 108 modifies the active version of the index tree 300 and the active version of the piece descriptor table 302.

It should be understood that the index node 316 and the piece descriptor 314 may still exist for use by the reader threads 110 that are not using the index node 414 as the root node of the index tree 300. A root index node is an index node having no ancestors. However the index node 316 and the piece descriptor 314 are omitted from FIG. 5 for the sake of clarity.

Figure 6:
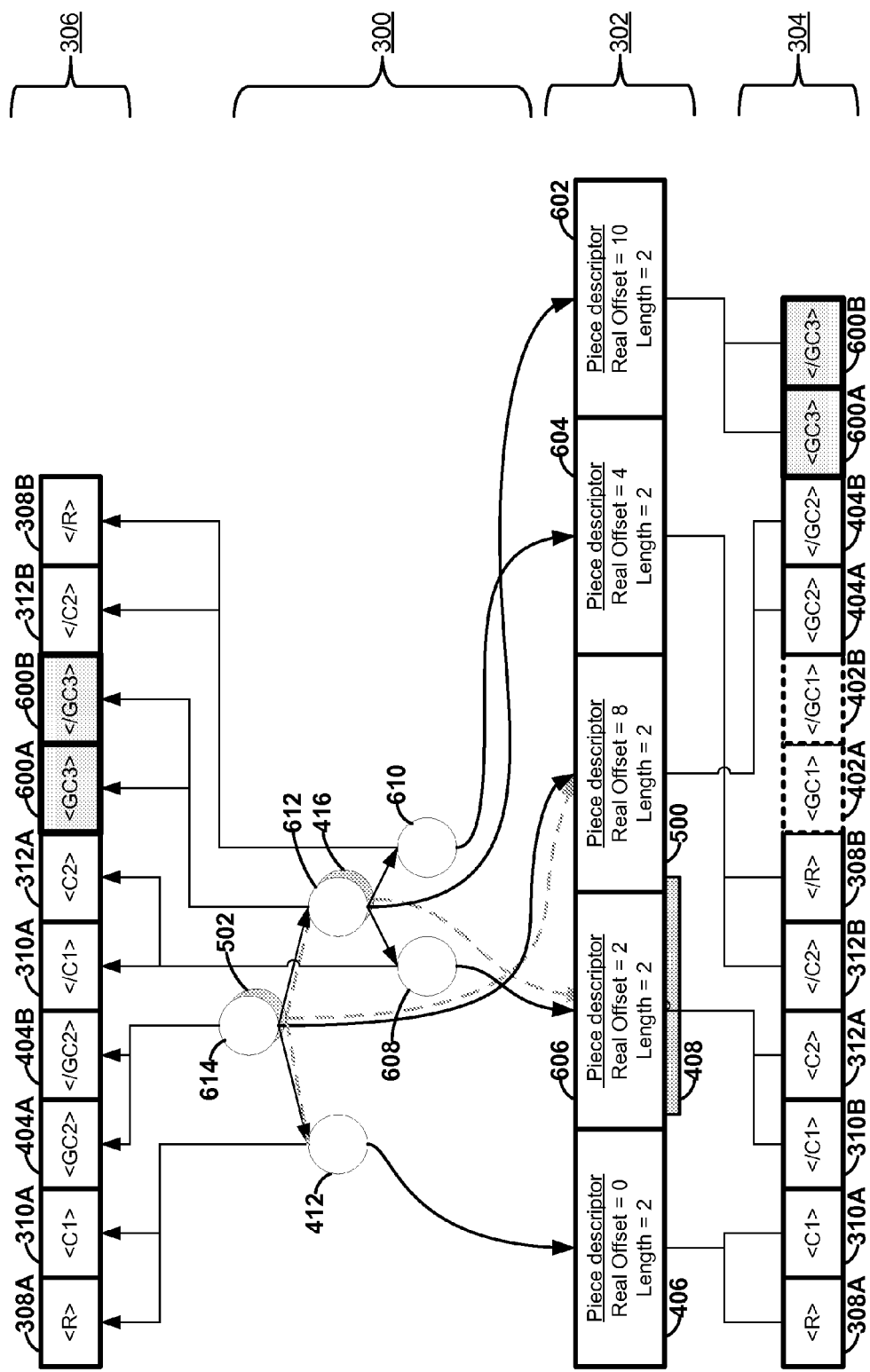
FIG. 6 illustrates the example representation of the document when additional elements are inserted within an existing piece.

FIG. 6 illustrates the example representation of the document 106 when additional elements are inserted within an existing piece. In the example of FIG. 6, the builder thread 108 inserts the elements 600A and 600B into the real element array 304. In the virtual element array 306, the elements 600A and 600B belong between the elements 312A and 312B. In other words, the elements 600A and 600B represent a document element that is below the document element represented by the elements 312A and 312B in the document tree 200.

To ensure that the elements 600A and 600B have the correct positions in the virtual element array 306, the builder thread 108 creates a new piece descriptor 602. The piece descriptor 602 identifies the piece of the real element array 304 containing the elements 600A and 600B. Because the piece containing the elements 600A and 600B logically occurs within the piece that contained the elements 310B, 312A, 312B, and 308B, the builder thread 108 generates piece descriptors 604 and 606. The piece descriptors 406, 606, 500, 604, and 602 constitute the active version of the piece descriptor table 302. The piece descriptor 604 indicates the piece of the real element array 304 containing the elements having virtual offsets that are greater than the virtual offsets of the elements 600A and 600B. The piece descriptor 606 indicates the piece of the real element array 304 containing the elements that have virtual offsets that are less than the virtual offsets of the elements 600A and 600B. The piece descriptor 606 replaces the piece descriptor 408.

The builder thread 108 then generates index nodes 608 and 610. The descriptor attribute of the index node 608 indicates the piece descriptor 606. The descriptor attribute of the index node 610 indicates the piece descriptor 604. Because the index nodes 608 and 610 are associated with elements to the left and right of the elements 600A and 600B, the index nodes 608 and 610 need to be child nodes of an index node associated with the elements 600A and 600B. Consequently, the left child attribute, the right child attribute, and the descriptor attribute of the index node 416 would need to change. Because the index node 416 is not allowed to change, the builder thread 108 generates an index node 612 to replace the index node 416. The left child attribute of the index node 612 indicates the index node 608. The right child attribute of the index node 612 indicates the index node 610. The descriptor attribute of the index node 612 indicates the piece descriptor 602.

Furthermore, the right child attribute of the index node 502 should change to indicate the new index node 612. Because the index node 502 is not allowed to change, the builder thread 108 generates an index node 614. The left child attribute of the index node 614 continues to indicate the index node 412, the right child attribute of the index node 614 indicates the index node 612, and the descriptor attribute of the index node 614 continues to indicate the piece descriptor 500. Hence, in the example of FIG. 6, the index nodes 614, 412, 612, 608, and 610 constitute the active version of the index tree 300.

It should be appreciated that FIGS. 4, 5, and 6 merely illustrate some combinations of actions that the builder thread 108 performs on the index tree 300 and the piece descriptor table 302 to maintain the proper relationship between the real element array 304 and the virtual element array 306.

Figure 7:
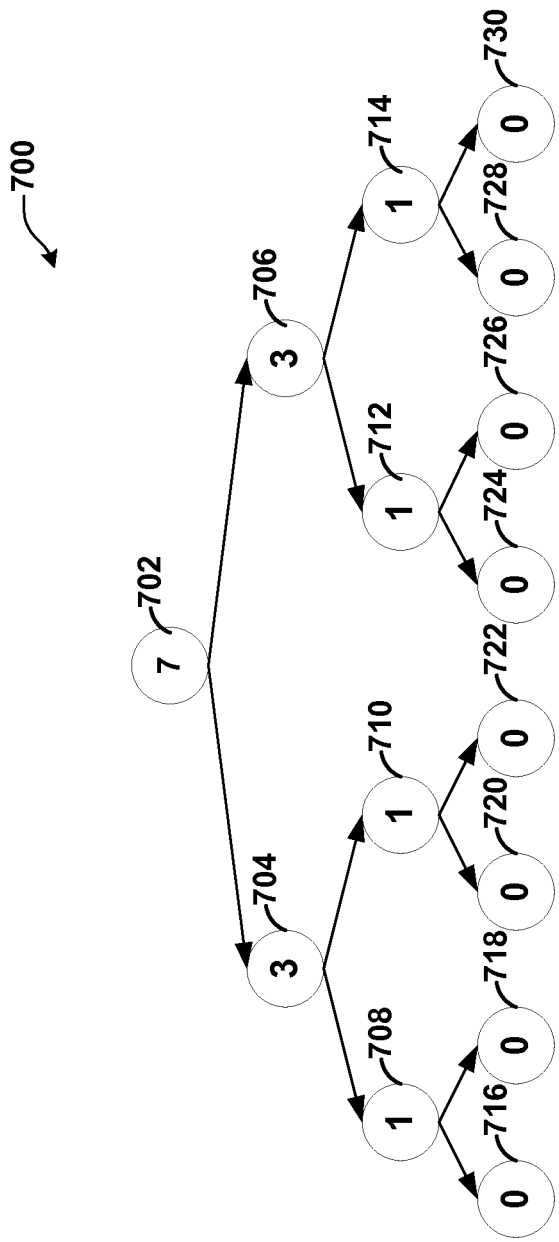
FIG. 7 illustrates an example index tree.

FIG. 7 illustrates an example index tree 700. The index tree 700 comprises fifteen index nodes 702 through 730. In the example of FIG. 7, the sizes of the left subtrees of the index nodes are shown within the index nodes. For example, the size of the left subtree of the index node 702 is seven because there are seven index nodes in the left subtree of the index node 702.

It is a property of the index tree 700 that the sizes of the left subtrees of the index nodes do not change. Consequently, any time the builder thread 108 adds an index node to the index tree 700 that is in the left subtree of any index node, the builder thread 108 generates replacement index nodes for all ancestor index nodes of the index node. However, to add an individual index node to the index tree 700, the builder thread 108 does not need to generate any replacements for index nodes that are not ancestor index nodes of the new index node. The examples of FIGS. 4 and 6 demonstrate this property.

Figure 8:
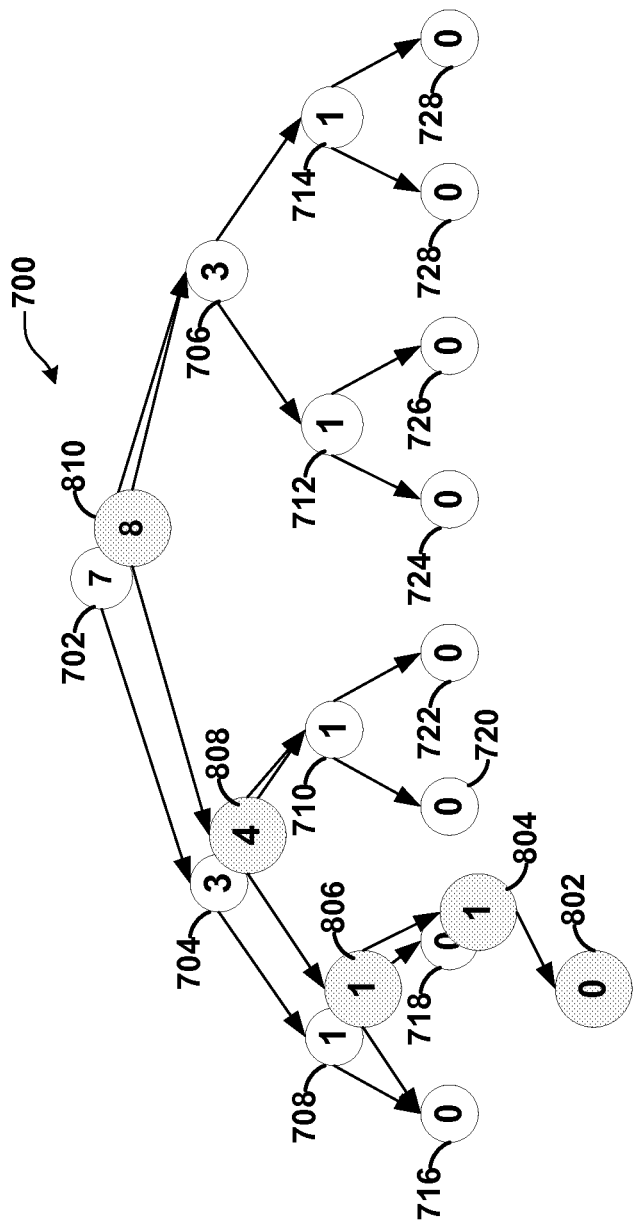
FIG. 8 illustrates the example index tree overlaid with replacement nodes belonging to a later version of the index tree.

FIG. 8 illustrates the index tree 700 overlaid with replacement nodes belonging to a later version of the index tree 700. In the example of FIG. 8, the builder thread 108 added an index node 802 to the index tree 700. Consequently, the builder thread 108 generates replacement index nodes 804, 806, 808, and 810. In the later version of the index tree 700, the replacement index nodes 804, 806, 808, and 810 replace the index nodes 718, 708, 704, and 702.

Figure 9:
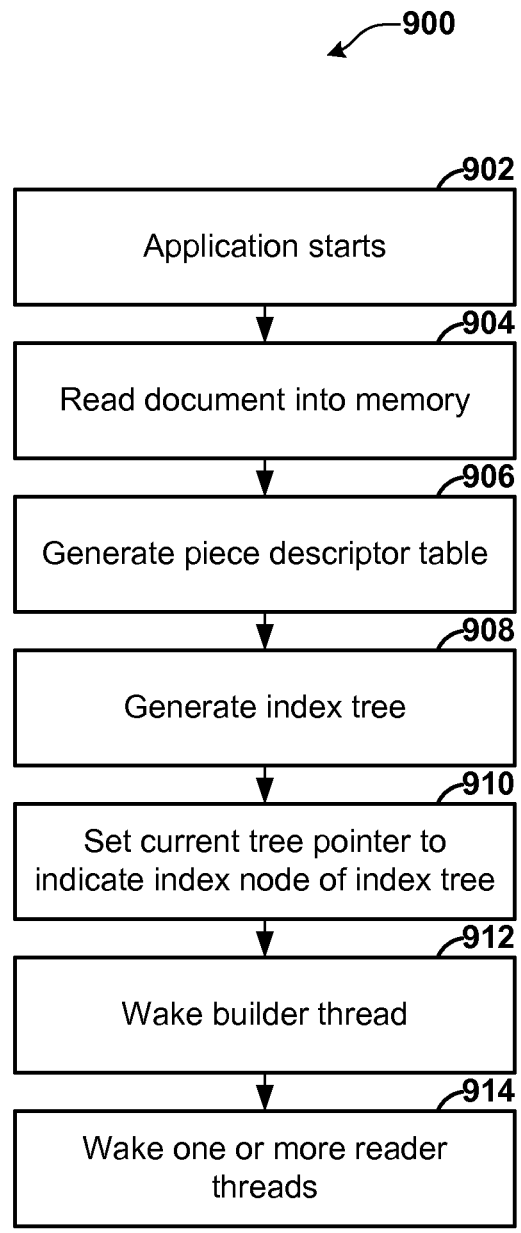
FIG. 9 is a flowchart illustrating an example operation performed by an application when the application starts.

FIG. 9 is a flowchart illustrating an example operation 900 performed by the application 104 when the application 104 starts. As illustrated in the example of FIG. 9, the operation 900 begins when the application 104 starts (902). In various embodiments, the application 104 starts in response to various events. For example, in some embodiments, the application 104 starts when the user 102 instructs an operating system of the computing system 100 to start the application 104. In other embodiments, the application 104 starts in response to a request from another application.

After the application 104 starts, the application 104 reads the document 106 from a local or remote data storage system into memory (904). In some embodiments, the application 104 does not immediately read the document 106 into memory after starting, but rather waits for some event before reading the document 106. For example, the application 104 can read the document 106 when the application 104 receives input from the user 102 to open the document 106.

When the application 104 reads the document 106 into memory, the application 104 stores elements that represent document elements in the document 106 in the real element array 304.

Next, the application 104 generates the piece descriptor table 302 (906). As shown in the example of FIG. 3, the piece descriptor table 302 initially contains only a single piece descriptor. The application 104 then generates the index tree 300 (908). As shown in the example of FIG. 3, the index tree 300 initially contains only a single index node. The descriptor attribute of the index node indicates the piece descriptor in the piece descriptor table 302.

After generating the piece descriptor table 302 and the index tree 300, the application 104 sets a current tree pointer to indicate the single index node in the index tree 300 (910). As described below with regard to FIG. 19, the reader threads 110 use the current tree pointer to determine the root index node of the most recent available non-active version of the index tree 300.

After the application 104 sets the current tree pointer, the application 104 wakes the builder thread 108 (912). Waking a thread is the process of getting the thread to start running. After the builder thread 108 wakes, the builder thread 108 can modify the active representation of the document 106 in response to user input to modify the document 106.

Each time the builder thread 108 receives input to modify the document 106, the builder thread 108 performs an operation that generates a new active representation of the document 106. After the builder thread 108 completes the operation, the new active representation of the document 106 becomes a non-active representation of the document 106 that is available for use by the reader threads 110. For instance, in some embodiments, the builder thread 108 performs element insertion operations and element deletion operations. Each time the builder thread 108 performs an element insertion operation, the builder thread 108 generates a new active representation of the document 106 in which the virtual element array 306 includes one or more additional elements. At the end of the element insertion operation, the new active representation of the document 106 becomes a non-active representation of the document 106 that is available for use by the reader threads 110. An example implementation of the element insertion operation is illustrated in FIGS. 10-13. Each time the builder thread 108 performs an element deletion operation, the builder thread 108 generates a new active representation of the document 106 in which the virtual element array 306 includes fewer elements. At the end of the element deletion operation, the new active representation of the document 106 becomes a non-active representation of the document 106 that is available for use by the reader threads 110. An example implementation of the element deletion operation is illustrated in FIGS. 14-18.

Next, the application 104 wakes the one or more reader threads 110 (914). Each of the one or more reader threads 110 performs an operation that initially looks at the current tree pointer to determine the root index node of the most-recent available non-active version of the index tree 300. For the duration of the operations performed by the reader threads 110, the reader threads 110 use that index node and index nodes indicated by the left and right child attributes of that index node to access elements in the real element array 304. In other words, during the operations performed by the reader threads 110, the reader threads 110 do not start looking at later versions of the index tree 300. The reader threads 110 can perform recurring operations. When an operation performed by one of the reader threads 110 recurs, the reader thread can again look at the current tree pointer to determine the root index node of the most-recent available non-active version of the index tree 300.

Because the builder thread 108 and the reader threads 110 can execute concurrently, because the builder thread 108 does not modify the non-active representations of the document 106, and because the reader threads 110 do not read from the active representation of the document 106, logical consistency of the non-active representation of the document 106 is ensured without locking data in the non-active representation of the document 106. Consequently, the builder thread 108 can remove a given element from the active representation of the document 106 while concurrently the reader threads 110 read the same given element from one or more non-active representations of the document 106. In this example, the given element represents the same document in the document tree of the document 106.

Figure 10:
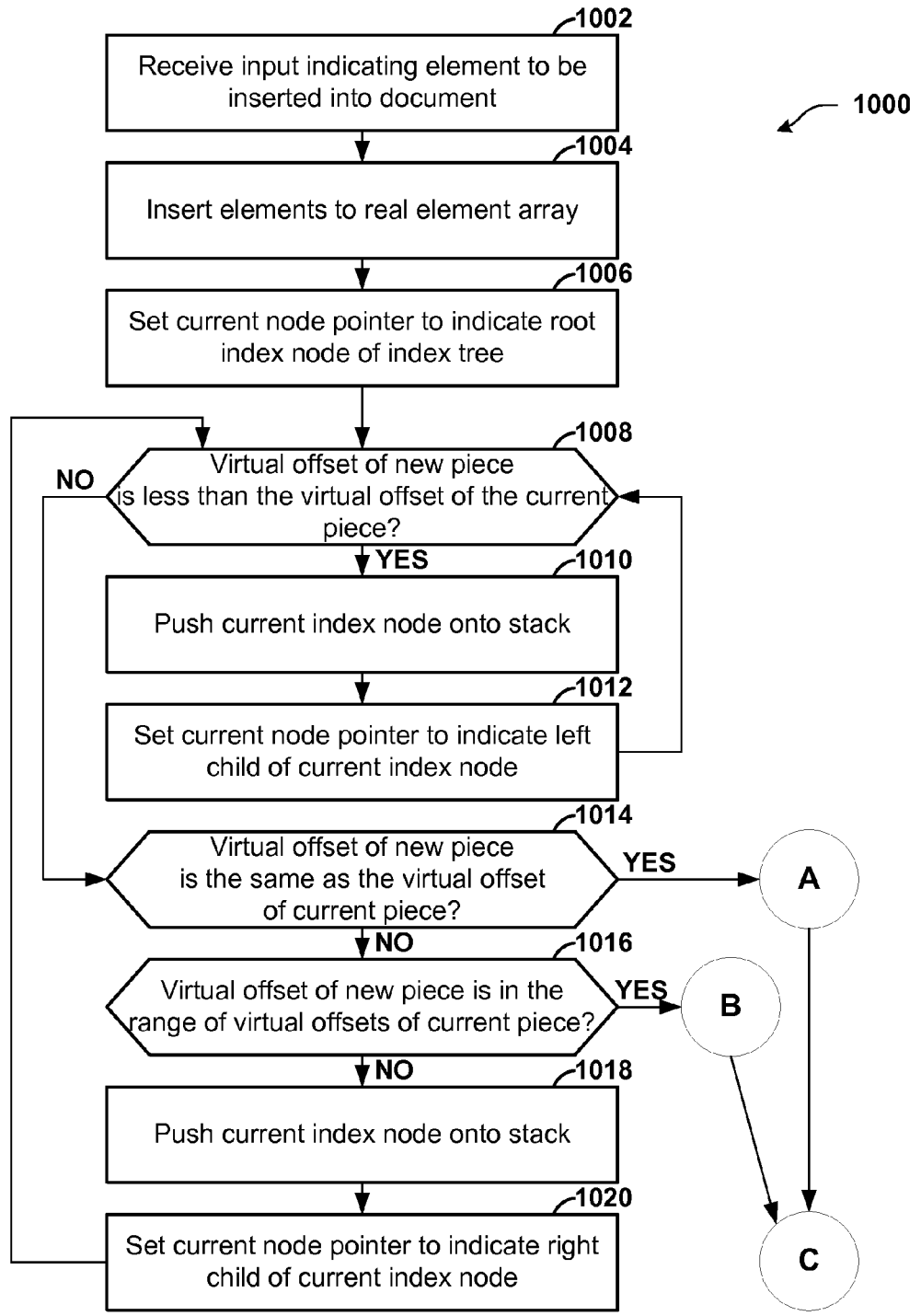
FIG. 10 is a flowchart illustrating an example element insertion operation.

FIG. 10 is a flowchart illustrating an example element insertion operation 1000. As illustrated in the example of FIG. 10, the element insertion operation 1000 begins when the builder thread 108 receives input indicating that elements are to be inserted into the document 106 (1002). In various embodiments, the builder thread 108 can receive such input in various ways. For example, the builder thread 108 can listen for keyboard input from a user of the application 104. In another example, the builder thread 108 can listen for instructions from another thread of the application 104 or another application to insert the elements.

In response to receiving the input, the builder thread 108 inserts one or more elements into the real element array 304 (1004). The inserted elements become a new piece of the real element array 304. In various embodiments, the builder thread 108 inserts elements into the real element array 304 in various ways. For example, in some embodiments, the builder thread 108 inserts an open element and a close element into the real element array 304 for at least some types of document elements. In such embodiments, the builder thread 108 inserts a single element into the real element array 304 for other types of elements.

Next, the builder thread 108 sets a current node pointer to indicate a root index node of a most-recent available non-active version of the index tree 300 (1006). In this specification, the current index node is the index node indicated by the current node pointer. Furthermore, in this specification, the current piece descriptor is the piece descriptor indicated by the current index node. Furthermore, in this specification, the current piece is the piece of the real element array 304 indicated by the current piece descriptor.

After setting the current node pointer, the builder thread 108 determines whether the virtual offset of the new piece is less than the virtual offset of the current piece (1008). The new piece is the piece of the real element array 304 containing the inserted elements. The virtual offset of the new piece is the distance from the beginning of the virtual element array 306 to the leftmost element of the inserted elements. The virtual offset of the current piece is the distance from the beginning of the virtual element array 306 to the leftmost element in the current piece.

If the virtual offset of the new piece is less than the virtual offset of the current piece ("YES" of 1008), the builder thread 108 pushes the current index node onto a stack (1010). In various embodiments, the builder thread 108 pushes the current index node onto the stack in various ways. For example, in some embodiments, the builder thread 108 pushes the current index node onto the stack by pushing a pointer to the current index node onto the stack.

After pushing the current index node onto the stack, the builder thread 108 sets the current node pointer to indicate the left child of the current index node (1012). By setting the current node pointer to indicate the left child of the current index node, the left child of the current index node becomes the "current" index node. The builder thread 108 then determines again whether the virtual offset of the new piece is less than the virtual offset of the current piece (1008). The builder thread 108 continues to repeat steps 1010 and 1012 as long as the virtual offset of the new piece is less than the virtual offset of the current piece.

If the virtual offset of the new piece is not less than the virtual offset of the current piece ("NO" of 1008), the builder thread 108 determines whether the virtual offset of the new piece is the same as the virtual offset of the current piece (1014). If the builder thread 108 determines that the virtual offset of the new piece is the same as the virtual offset of the current piece ("YES" of 1014), the builder thread 108 performs the operation "A" illustrated in FIG. 11. After the builder thread 108 performs the operation "A," the builder thread 108 performs the operation "C" illustrated in FIG. 13 to complete the element insertion operation 1000.

If the builder thread 108 determines that the virtual offset of the new piece is not the same as the virtual offset of the current piece ("NO" of 1014), the builder thread 108 determines whether the virtual offset of the new piece is within the range of the virtual offsets of the current piece (1016). If the builder thread 108 determines that the virtual offset of the new piece is within the range of the virtual offsets of the current piece ("YES" of 1016), the builder thread 108 performs the operation "B" illustrated in FIG. 12. After the builder thread 108 performs the operation "B," the builder thread 108 performs the operation "C" illustrated in FIG. 13 to complete the element insertion operation 1000.

If the builder thread 108 determines that the virtual offset of the new piece is not within the range of the virtual offsets of the current piece ("NO" of 1016), the builder thread 108 pushes the current index node onto the stack (1018). After pushing the current index node onto the stack, the builder thread 108 sets the current node pointer to indicate the right child of the current index node (1020). By setting the current node pointer to indicate the right child of the current index node, the right child of the current index node becomes the "current" index node. After setting the current node pointer to indicate the right child of the current index node, the builder thread 108 again determines whether the virtual offset of the new piece is less than the virtual offset of the current piece (1008), and so on.

Figure 11:
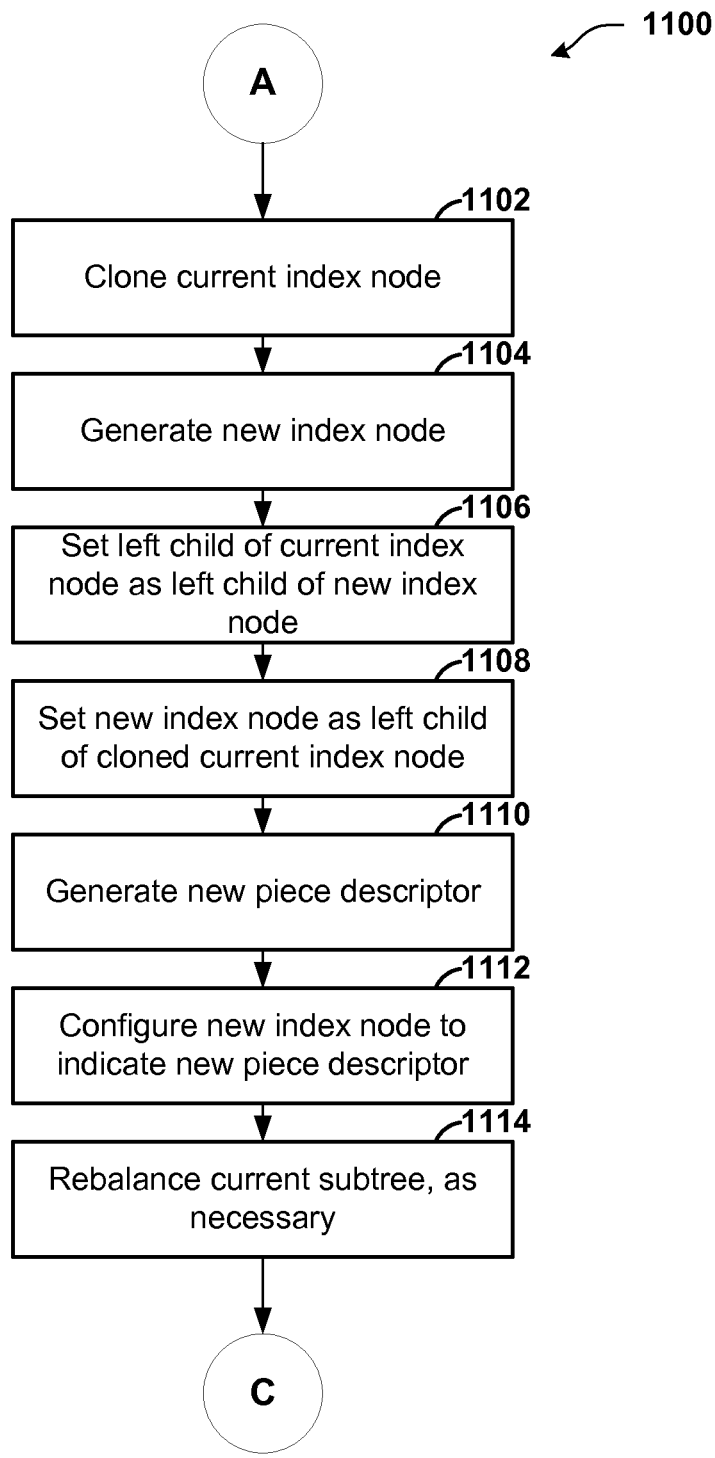
FIG. 11 is flowchart illustrating a continuation of the example element insertion operation.

FIG. 11 is a flowchart illustrating a continuation 1100 of the example element insertion operation 1000. As illustrated in the example of FIG. 11, the continuation 1100 starts when the builder thread 108 clones the current index node (1102). In this specification, whenever the builder thread 108 "clones" the current index node, the builder thread 108 generates a new index node referred to herein as the cloned current index node. The cloned current index node, at least initially, has the same left child attribute, right child attribute, and descriptor attribute as the current index node. In this way, if the current index node has a left child, the left child of the current index node becomes the left child of the cloned current index node. Furthermore, if the current index node has a right child, the right child of the current index node becomes the right child of the cloned current index node. Furthermore, when the builder thread 108 clones the current index node, the builder thread 108 sets the descriptor attribute of the cloned current node to indicate the current piece descriptor.

After cloning the current index node, the builder thread 108 generates a new index node (1104). Like other index nodes, the new index node has a left child attribute, a right child attribute, and a descriptor attribute. The builder thread 108 sets the left child attribute of the new index node to indicate the left child of the current index node (1106). In this way, the left child of the current index node becomes the left child of the new index node.

Next, the builder thread 108 configures the left child attribute of the cloned index node to indicate the new index node (1108). In this way, the new index node becomes the left child of the cloned current index node.

The builder thread 108 then generates a new piece descriptor (1110). The new piece descriptor indicates the piece of the real element array 304 containing the inserted elements. The builder thread 108 then sets the descriptor attribute of the new index node to indicate the new piece descriptor (1112).

The builder thread 108 then rebalances the current subtree (1114). After rebalancing the current subtree, the builder thread 108 performs the operation "C" illustrated in FIG. 13 to complete the element insertion operation 1000. The current subtree is the combination of the left subtree of the cloned current index node, the cloned current index node, and the right subtree of the cloned current index node.

When the current subtree is rebalanced, the index nodes in the current subtree are rearranged such that the depth of the left subtree and the depth of the right subtree of each node in the index tree differ by no more than one. Furthermore, when the current subtree is rebalanced, the current subtree maintains the sorting property. The sorting property provides that for each given index node in the current subtree, index nodes in the left subtree of the given index node are associated with elements having virtual offsets that are less than the virtual offsets of elements associated with the given index node and index nodes in the right subtree of the given index node are associated with elements having virtual offsets that are greater than the virtual offsets of the elements associated with the given index node. Several existing "tree rotation" algorithms for rebalancing AVL trees, such as the current index tree, are known in the art.

To rearrange the index nodes in the current tree during the rebalancing process, the builder thread 108 changes the left or right child attributes of some of the index nodes in the current subtree. If builder thread 108 needs to change the left or right child attributes of a given index node in the current subtree, the builder thread 108 clones the given index node before changing the left or right child attributes of the given index node.

Figure 12:
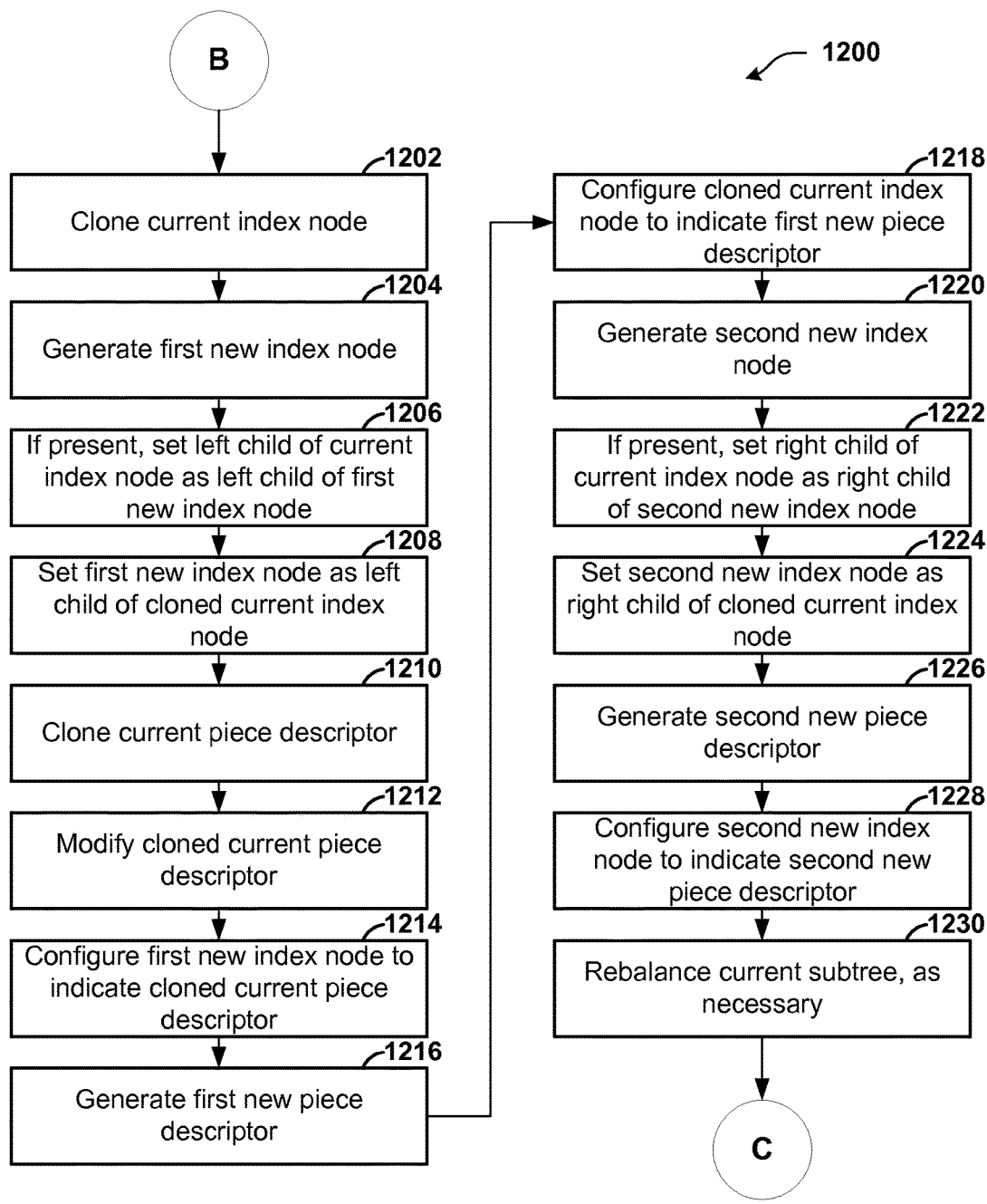
FIG. 12 is a flowchart illustrating a further continuation of the example element insertion operation.

FIG. 12 is a flowchart illustrating a continuation 1200 of the example element insertion operation 1000. As illustrated in the example of FIG. 12, the continuation 1200 starts when the builder thread 108 clones the current index node (1202). The builder thread 108 then generates a first new index node (1204). If a left child of the current index node exists, the builder thread 108 configures the left child attribute of the first new index node to indicate the left child of the current index node (1206). In this way, the left child of the current index node becomes the left child of the first new index node. The builder thread 108 then configures the left child attribute of the cloned current index node to indicate the first new index node (1208). In this way, the first new index node becomes the left child of the cloned current index node.

Next, the builder thread 108 clones the current piece descriptor (1212). When the builder thread 108 clones the current piece descriptor, the builder thread 108 generates a new piece descriptor referred to herein as the cloned current piece descriptor. The cloned current piece descriptor initially has the same offset attribute and length attribute as the current piece descriptor. The builder thread 108 modifies the cloned current piece descriptor (1212). The builder thread 108 modifies the cloned current piece descriptor such that the current piece is limited to the elements having virtual offsets that are less than the virtual offsets of the inserted elements. For example, if the current piece included elements having real offsets of 10 through 20, the length attribute of the current piece descriptor of 21. In this example, the inserted elements have virtual offsets between the virtual offsets of the elements having real offsets of 15 and 16. Consequently, in this example, the builder thread 108 modifies the length attribute of the cloned current piece descriptor such that the length attribute has a value of 6 instead of 21. The builder thread 108 then configures the descriptor attribute of the first new index node to indicate the cloned current piece descriptor (1214).

Next, the builder thread 108 generates a first new piece descriptor (1216). The first new piece descriptor indicates the current piece. The builder thread 108 then configures the descriptor attribute of the cloned current index node to indicate the first new piece descriptor (1218).

The builder thread 108 then generates a second new index node (1220). If a right child of the current index node exists, the builder thread 108 configures the second new index node such that the right child of the current index node is the right child of the second new index node (1222). Next, the builder thread 108 configures the right child attribute of the cloned current index node such that the right child attribute of the cloned current index node indicates the second new index node (1224).

The builder thread 108 then generates a second new piece descriptor (1226). The second new piece descriptor indicates the elements that were previously in the current piece that have virtual offsets that are greater than the virtual offsets of the inserted elements. For example, if the current piece included elements having real offsets 10 through 20 and the leftmost inserted element has a virtual offset between the virtual offsets of the elements having real offsets 15 and 16, the second new piece descriptor have an offset attribute of 16 and a length attribute of 5. In this example, the elements having real offsets between 16 and 20 are the elements that were previously in the current piece that have virtual offsets greater than the virtual offsets of the inserted elements.

The builder thread 108 then configures the descriptor attribute of the second new index node to indicate the second new piece descriptor (1228). After configuring the descriptor attribute of the second new index node to indicate the second new piece descriptor, the builder thread 108 rebalances the current subtree, as necessary (1230). After rebalancing the current subtree, the builder thread 108 performs the operation "C" illustrated in FIG. 13 to complete the element insertion operation 1000.

Figure 13:
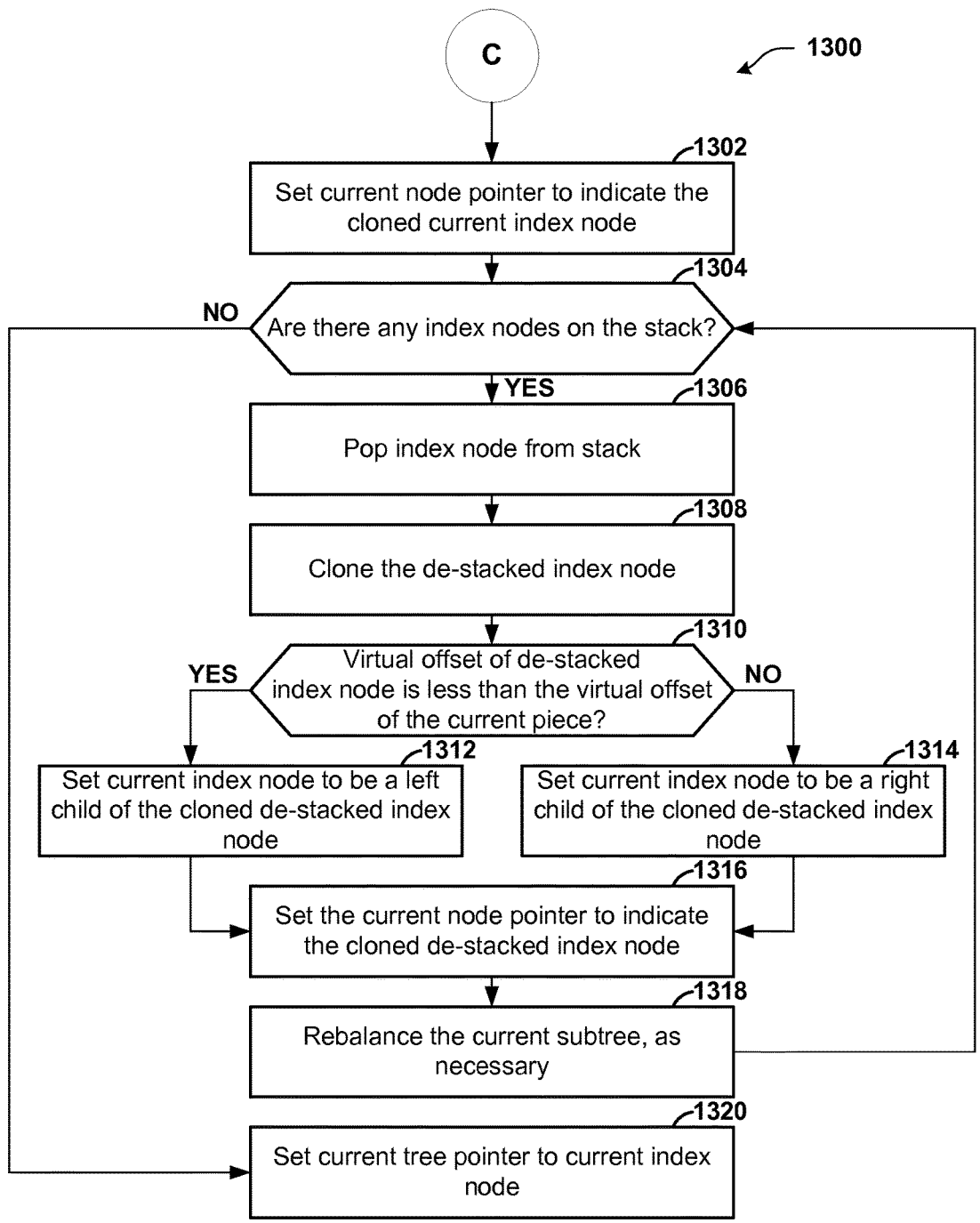
FIG. 13 is a flowchart illustrating a further continuation of the example element insertion operation.

FIG. 13 is a flowchart illustrating a continuation 1300 of the example element insertion operation 1000. As illustrated in the example of FIG. 13, the continuation 1300 begins when the builder thread 108 sets the current node pointer to indicate the cloned current index node (1302). In this way, the cloned current index node becomes the "current" index node.

Next, the builder thread 108 determines whether there are any index nodes on the stack (1304). If there are one or more index nodes on the stack, the builder thread 108 pops an index node from the stack (1306). The builder thread 108 then clones the de-stacked index node (1308). When the builder thread 108 clones the de-stacked index node, the builder thread 108 generates a new index node referred to herein as the cloned de-stacked index node. When the builder thread 108 clones the de-stacked index node, the left child attribute, the right child attribute and the descriptor attribute of the cloned de-stacked index node are the same as the left child attribute, the right child attribute, and the descriptor of the de-stacked index node.

After cloning the de-stacked index node, the builder thread 108 determines whether the virtual offset of the piece associated with the de-stacked index node is less than the virtual offset of the piece associated with the current index node (1310). If the virtual offset of the piece associated with the de-stacked index node is less than the virtual offset of the piece associated with the current index node ("YES" of 1310), the builder thread 108 sets the left child attribute of the cloned de-stacked index node to indicate the current index node (1312). In this way, the current index node becomes the left child of the cloned de-stacked index node.

Otherwise, if the virtual offset of the piece associated with the de-stacked index node is not less than (i.e., is greater than) of the virtual offset of the piece associated with the current index node ("NO" of 1310), the builder thread 108 sets the right child attribute of the cloned de-stacked index node to indicate the current index node (1314). In this way, the current index node becomes the right child of the cloned de-stacked index node.

After setting the left or right child attributes of the cloned de-stacked index node, the builder thread 108 sets the current node pointer to indicate the cloned de-stacked index node (1316). In this way, the cloned de-stacked index node becomes the "current" index node. After setting the current node pointer to indicate the cloned de-stacked index node, the builder thread 108 again determines whether there are any index nodes on the stack (1304). If there are index nodes on the stack, the builder thread 108 repeats the steps 1306, 1308, 1310, 1312 or 1314, 1316, and 1318. Otherwise, if there are no index nodes on the stack, the builder thread 108 sets the current tree pointer to indicate the current index node (1320). After setting the current tree pointer to indicate the current index node, the element insertion operation 1000 is complete. Furthermore, after the builder thread 108 sets the current tree pointer, the active representation of the document 106 becomes the most recent available non-active representation of the document 106.

Figure 14:
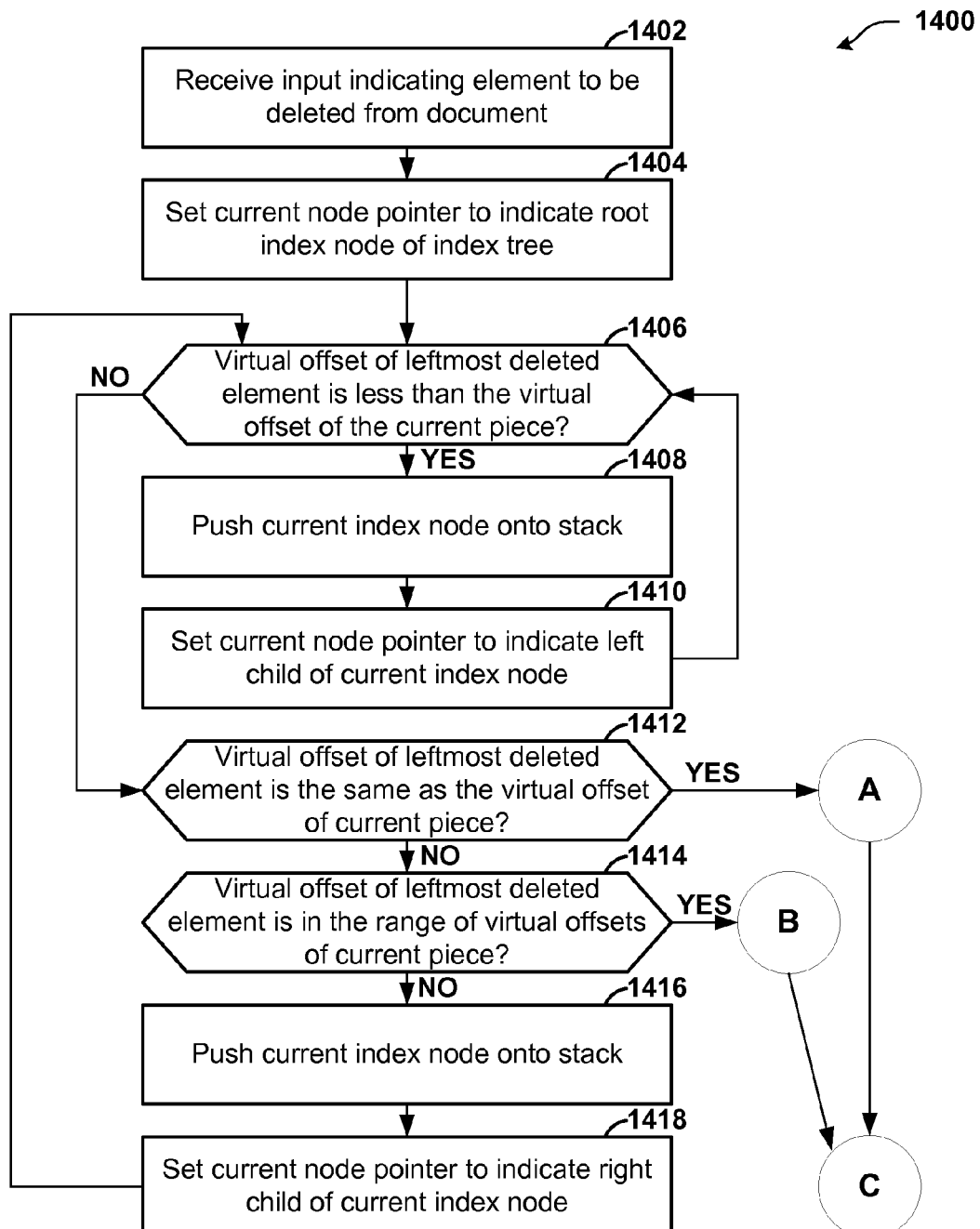
FIG. 14 is a flowchart illustrating an example element deletion operation.

FIG. 14 is a flowchart illustrating an example element deletion operation 1400. As illustrated in the example of FIG. 14, the element deletion operation 1400 begins when the builder thread 108 receives input indicating that elements are to be removed from the document 106 (1402).

In response to receiving the input, the builder thread 108 sets a current node pointer to indicate the root index node of the most-recent available non-active version of the index tree 300 (1404). In other words, the builder thread 108 sets the current node pointer equal to the current tree pointer.

Next, the builder thread 108 determines whether the virtual offset of the leftmost deleted element is less than the virtual offset of the current piece (1406). The current piece is the piece of the real element array 304 indicated by the piece descriptor indicated by the current index node. If the virtual offset of the leftmost deleted element is less than the virtual offset of the current piece ("YES" of 1406), the builder thread 108 pushes the current index node onto a stack (1408). After pushing the current index node onto the stack, the builder thread 108 sets the current node pointer to indicate the left child of the current index node (1410). In this way, the left child of the current index node becomes the "current" index node. After setting the current node pointer, the builder thread 108 again determines whether the virtual offset of the leftmost deleted element is less than the virtual offset of the current piece (1406). The builder thread 108 continues to repeat steps 1408 and 1410 as long as the virtual offset of the leftmost deleted element is less than of the virtual offset of the current piece.

If the virtual offset of the leftmost deleted element is not less than the virtual offset of the current piece ("NO" of 1406), the builder thread 108 determines whether the virtual offset of the leftmost deleted element is the same as the virtual offset of the current piece (1412). If the builder thread 108 determines that the virtual offset of the leftmost deleted element is the same as the virtual offset of the current piece ("YES" of 1412), the builder thread 108 performs the operation "A" illustrated in FIG. 15. After the builder thread 108 performs the operation "A," the builder thread 108 performs the operation "C" illustrated in FIG. 18 to complete the element deletion operation 1400.

If the builder thread 108 determines that the virtual offset of the leftmost deleted element is not the same as the virtual offset of the current piece ("NO" of 1412), the builder thread 108 determines whether the leftmost deleted element is within the range of virtual offsets of the current piece (1414). If the builder thread 108 determines that the virtual offset of the leftmost deleted element is within the range of virtual offsets of the current piece ("YES" of 1414), the builder thread 108 performs the operation "B" illustrated in FIG. 16. After the builder thread 108 performs the operation "B," the builder thread 108 performs the operation "C" illustrated in FIG. 18 to complete the element deletion operation 1400.

Otherwise, if the builder thread 108 determines that the virtual offset of the leftmost deleted element is not within the range of virtual offsets of the current piece ("NO" of 1414), the builder thread 108 pushes the current index node onto the stack (1416). The builder thread 108 then sets the current node pointer to indicate the right child of the current index node (1418). In this way, the right child of the current index node becomes the "current" index node. After setting the current node pointer to indicate the right child of the current index node, the builder thread 108 determines whether the virtual offset of the leftmost deleted element is less than the virtual offset of the current piece (1406). The builder thread 108 continues to perform the steps 1406, 1408, 1410, 1412, 1414, 1416, and 1418 until either the virtual offset of the leftmost deleted element is the same as the virtual offset of the current piece or the virtual offset of the leftmost deleted element is within the range of virtual offsets of the current piece.

Figure 15:
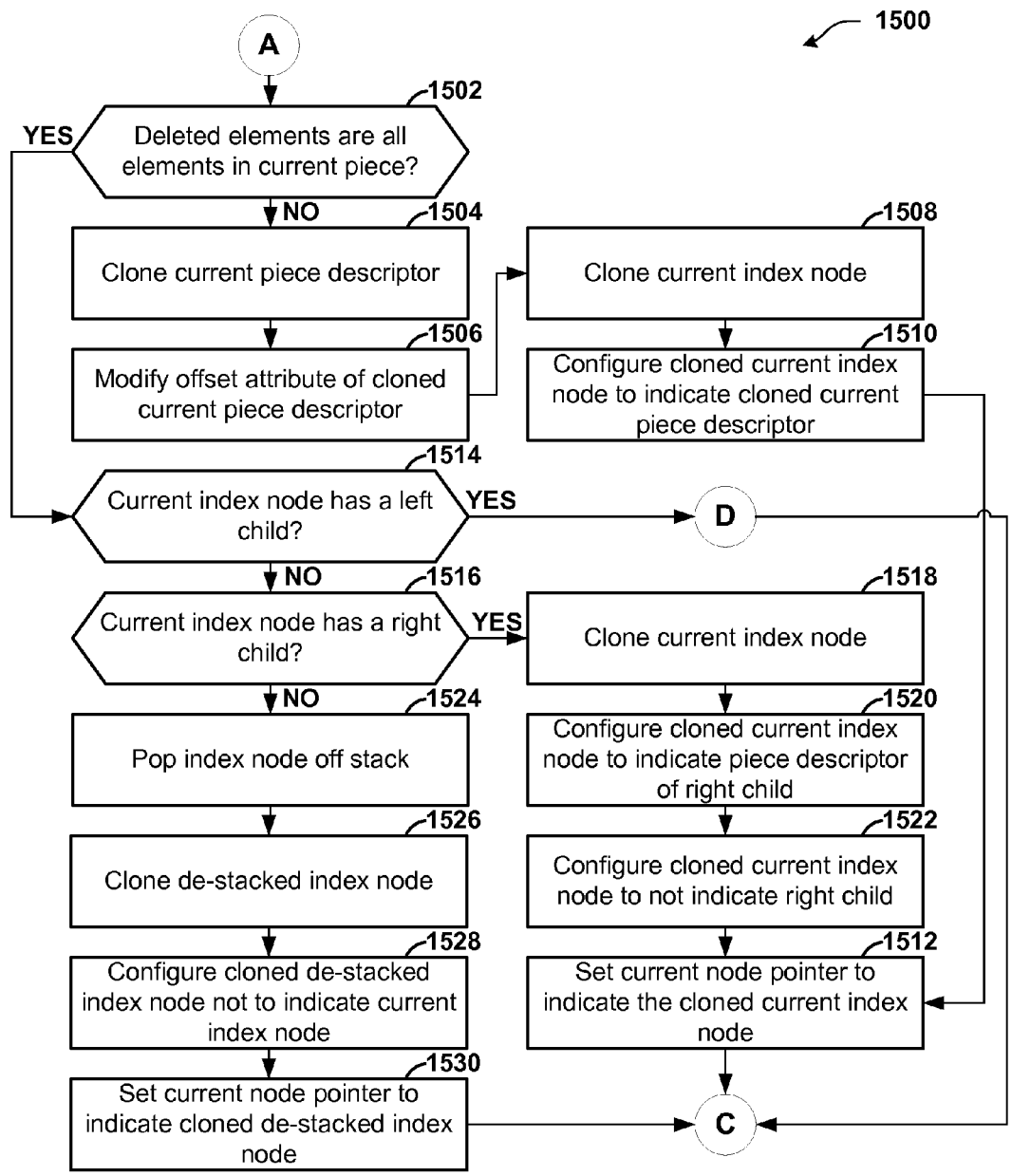
FIG. 15 is a flowchart illustrating a continuation of the example element deletion operation.

FIG. 15 is a flowchart illustrating a continuation 1500 of the example element deletion operation 1400. As illustrated in the example of FIG. 15, the continuation 1500 starts when the builder thread 108 determines whether the deleted elements are all of the elements in the current piece (1502).

If the deleted elements are not all of the elements in the current piece ("NO" of 1502), the builder thread 108 clones the current piece descriptor (1504). When the builder thread 108 clones the current piece descriptor, the builder thread 108 generates a new piece descriptor referred to herein as the cloned current piece descriptor. The cloned current piece descriptor initially has the same offset attribute and length attribute as the current piece descriptor.

The builder thread 108 then modifies the offset attribute of the cloned current piece descriptor such that the real offset attribute indicates that the current piece starts at the virtual offset of the leftmost element in the current piece following the rightmost deleted element (1506). For example, if the current piece includes elements at real offsets of 10 through 20 and elements at real offsets 10 and 11 are to be removed from the active representation of the document 106, the builder thread 108 modifies the real offset attribute of the current piece descriptor such that the real offset attribute is 12. This is the scenario illustrated in the example of FIG. 4.

The builder thread 108 then clones the current index node (1508). After cloning the current index node, the builder thread 108 configures the descriptor attribute of the cloned current index node to indicate the cloned current piece descriptor (1510). The builder thread 108 then sets the current node pointer to indicate the cloned current index node (1512). After setting the current node pointer, the builder thread 108 performs the operation "C" illustrated in FIG. 18 to complete the element deletion operation 1400.

Otherwise, if the deleted elements are all of the elements in the current piece ("YES" of 1502), the builder thread 108 determines whether the current index node has a left child (1514). If the current index node has a left child ("YES" of 1514), the builder thread 108 performs the operation "D" illustrated in FIG. 16 and then performs the operation "C" illustrated in FIG. 18 to complete the element deletion operation 1400.

On the other hand, if the current index node does not have a left child ("NO" of 1514), the builder thread 108 determines whether the current index node has a right child (1516). If the builder thread 108 determines that the current index node has a right child ("YES" of 1516), the builder thread 108 clones the current index node (1518). After cloning the current index node, the builder thread 108 configures the descriptor attribute of the cloned current index node to indicate the piece descriptor indicated by the right child of the current index node (1520). The builder thread 108 then configures the right child attribute of the cloned current index node to indicate no index node (1522). The builder thread 108 then sets the current node pointer to indicate the cloned current index node (1512). After setting the current node pointer, the builder thread 108 performs the operation "C" illustrated in FIG. 18 to complete the element deletion operation 1400.

If the current index node does not have a right child ("NO" of 1516), the builder thread 108 pops an index node off the stack (1524). The de-stacked index node is the parent of the current index node. The builder thread 108 then clones the de-stacked index node (1526). Next, the builder thread 108 configures the cloned de-stacked index node not to indicate the current index node (1528). In this way, the builder thread 108 removes the current index node from the active representation of the document 106. The builder thread 108 then sets the current node pointer to indicate the cloned de-stacked index node (1530). In this way, the cloned de-stacked index node becomes the "current" index node. The builder thread 108 then performs the operation "C" illustrated in FIG. 18 to complete the element deletion operation 1400.

Figure 16:
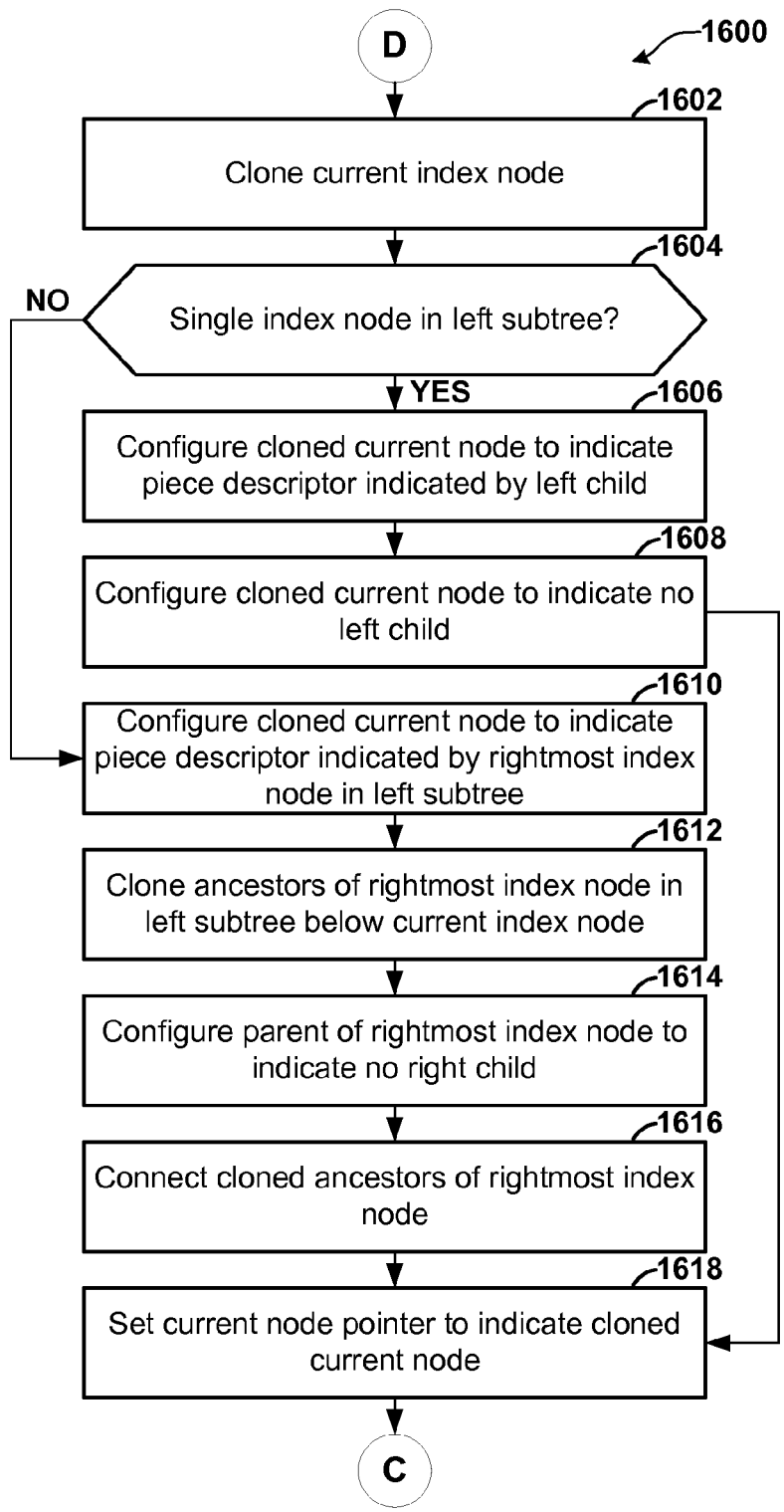
FIG. 16 is a flowchart illustrating a continuation of the example element deletion operation.

FIG. 16 is a flowchart illustrating a continuation 1600 of the element deletion operation 1400. As illustrated in the example of FIG. 16, the continuation 1600 begins when the builder thread 108 clones the current index node (1602). Next, the builder thread 108 determines whether there is only a single node in the left subtree of the current index node (1604). If there is only a single node in the left subtree of the current index node ("YES" of 1604), the builder thread 108 configures the descriptor attribute of the cloned current index node to indicate the piece descriptor indicated by the left child of the current index node (1606). In this way, the builder thread 108 removes the current piece descriptor from the active version of the piece descriptor table 302. Next, the builder thread 108 configures the left child attribute of the cloned current index node to indicate no other index node (1608). In this way, the builder thread 108 removes the left child from the active version of the index tree 300.

If there is more than a single index node in the left subtree of the current index node ("NO" of 1604), the builder thread 108 configures the descriptor attribute of the cloned current index node to indicate the piece descriptor indicated by the rightmost index node in the left subtree of the current index node (1610). In this way, the builder thread 108 removes the piece descriptor initially indicated by the current index node from the active version of the piece descriptor table 302. For ease of explanation, this specification refers to the rightmost index node in the left subtree of the current index node as the "rightmost index node." Next, the builder thread 108 clones the ancestor index nodes of the rightmost index node below the current index node (1612). For example, if there are three index nodes in the index tree 300 between the current index node and the rightmost index node, the builder thread 108 clones these three index nodes.

After cloning the ancestor index nodes, the builder thread 108 configures the right child attribute of the parent of the rightmost index node to not indicate any index node (1614). In this way, the rightmost index node is removed from the active version of the index tree 300. The builder thread 108 then connects the cloned ancestor index nodes of the rightmost index node (1616). For example, if there are three index nodes in the index tree 300 between the current index node and the rightmost index node, the builder thread 108 configures left or right child attributes of the clones of these three index nodes such that the clones of these three index nodes have the same parent-child relationships as these three index nodes.

The builder thread 108 then sets the current node pointer to indicate the cloned current index node (1618). After setting the current node pointer, the builder thread 108 performs the operation "C" illustrated in FIG. 18 to complete the element deletion operation 1400.

Figure 17:
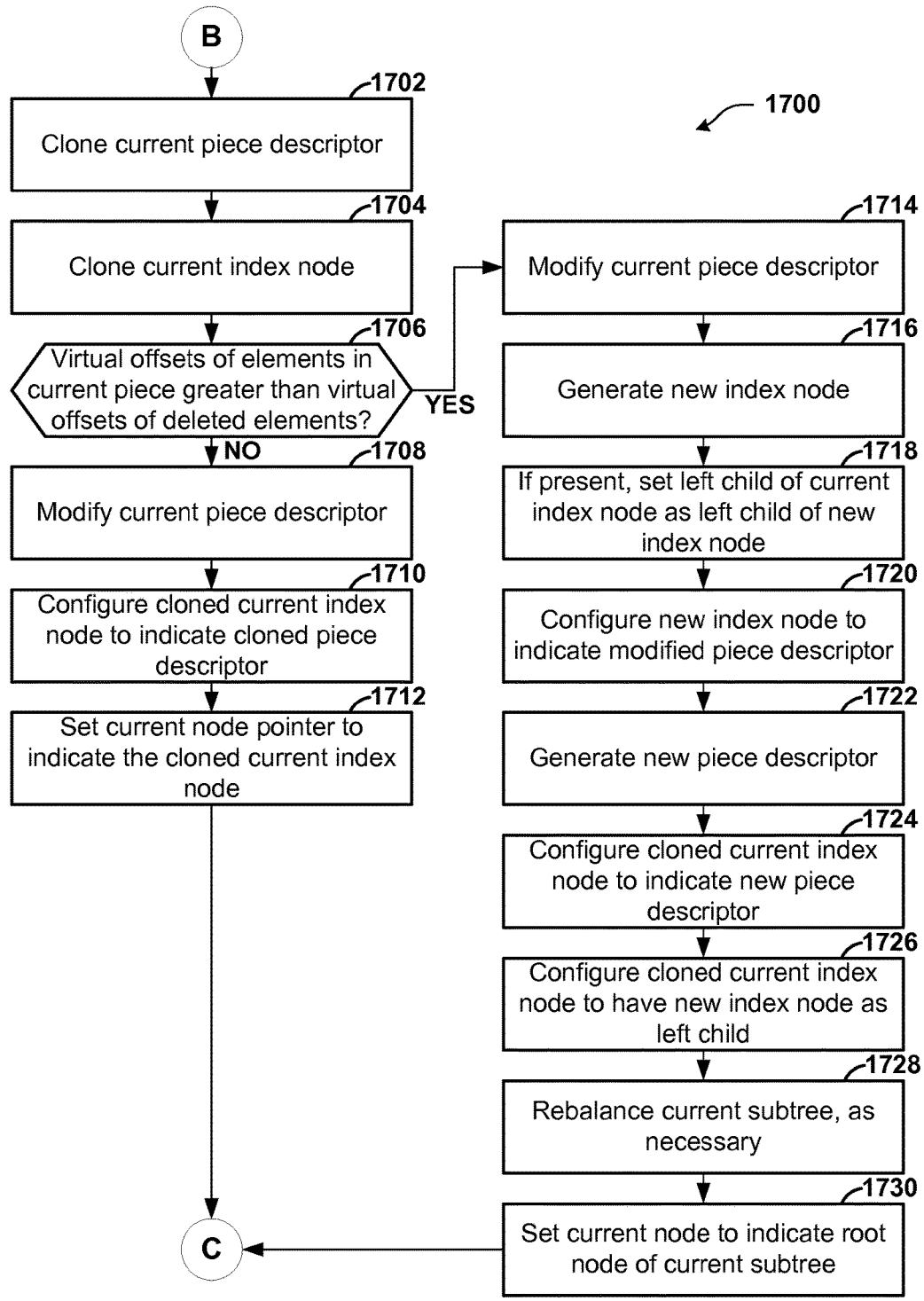
FIG. 17 is a flowchart illustrating a continuation of the example element deletion operation.

FIG. 17 is a flowchart illustrating a further continuation 1700 of the element deletion operation 1400. As illustrated in the example of FIG. 17, the continuation 1700 begins when the builder thread 108 clones the current piece descriptor (1702). As discussed above, the current piece descriptor is the piece descriptor indicated by the current index node. When the builder thread 108 clones the current piece descriptor, the builder thread 108 generates a new piece descriptor referred to herein as the cloned current piece descriptor. At least initially, the cloned current piece descriptor has the same offset attribute and length attribute as the current piece descriptor. Next, the builder thread 108 clones the current index node (1704).

The builder thread 108 then determines whether there are elements in the current piece having virtual offsets greater than the virtual offset of the deleted elements (1706). If there are no elements in the current piece having virtual offsets that are greater than the virtual offsets of the deleted elements ("NO" of 1706), the builder thread 108 modifies the length attribute of the cloned current piece descriptor (1708). The builder thread 108 modifies the length attribute of the cloned current piece descriptor to indicate a piece of the real element array 304 that does not extend to the leftmost deleted element. For example, if the current piece includes elements having real offsets 10 through 20 and elements at real offsets 19 and 20 are to be removed from the active representation of the document 106, the builder thread 108 modifies the length attribute of the cloned current piece descriptor such that the length attribute is 9 instead of 11. After modifying the length attribute of the cloned current piece descriptor, the builder thread 108 performs the operation "C" illustrated in FIG. 18 to complete the element deletion operation 1400.

Next, the builder thread 108 configures the descriptor attribute of the cloned current index node to indicate the cloned current piece descriptor (1710). In this way, the cloned current piece descriptor becomes the piece descriptor indicated by the cloned current index node. After configuring the descriptor attribute of the cloned current index node to indicate the cloned current piece descriptor, the builder thread 108 sets the current node pointer to indicate the cloned current index node (1712). The builder thread 108 then performs the operation "C" illustrated in the example of FIG. 18 to complete the element deletion operation 1400.

Otherwise, if there are one or more elements in the current piece having virtual offsets greater than the virtual offsets of the deleted elements ("YES" of 1706), the builder thread 108 modifies the length attribute of the cloned current piece descriptor such that the cloned current piece descriptor indicates a piece of the real element array 304 that only extends up to the leftmost deleted element (1714). For example, if the current piece included elements having real offsets 10 through 20 and elements having real offsets 15 and 16 are to be removed from the active representation of the document 106, the builder thread 108 modifies the length attribute of the cloned current piece descriptor such that the length attribute is 5.

After modifying the length attribute of the cloned current piece descriptor, the builder thread 108 generates a new index node (1716). If the current index node has a left child, the builder thread 108 then configures the left child attribute of the new index node to indicate the left child of the current index node (1718). In this way, the left child of the current index node becomes the left child of the new index node. The builder thread 108 then configures the descriptor attribute of the new index node to indicate the cloned current piece descriptor (1720). In this way, the cloned current piece descriptor becomes the piece descriptor indicated by the new index node.

The builder thread 108 then generates a new piece descriptor (1722). The new piece descriptor indicates a piece of the real element array 304 containing the elements that were part of the current piece having virtual offsets greater than the virtual offsets of the deleted elements. For example, if the current piece included elements having real offsets 10 through 20 and the deleted elements are elements having real offsets 15 and 16, the new piece descriptor has a real offset attribute of 17 and a length attribute of 4.

Next, the builder thread 108 configures the descriptor attribute of the cloned current index node to indicate the new piece descriptor (1724). The builder thread 108 then configures the left child attribute of the cloned current index node to indicate the new index node (1726). In this way, the new index node becomes the left child of the cloned current index node. The builder thread 108 then rebalances the current subtree (1728). After rebalancing the current subtree, the builder thread 108 sets the current node pointer to indicate the root node of the current subtree (1730). The builder thread 108 then performs the operation "C" illustrated in FIG. 18 to complete the element deletion operation 1400.

Figure 18:
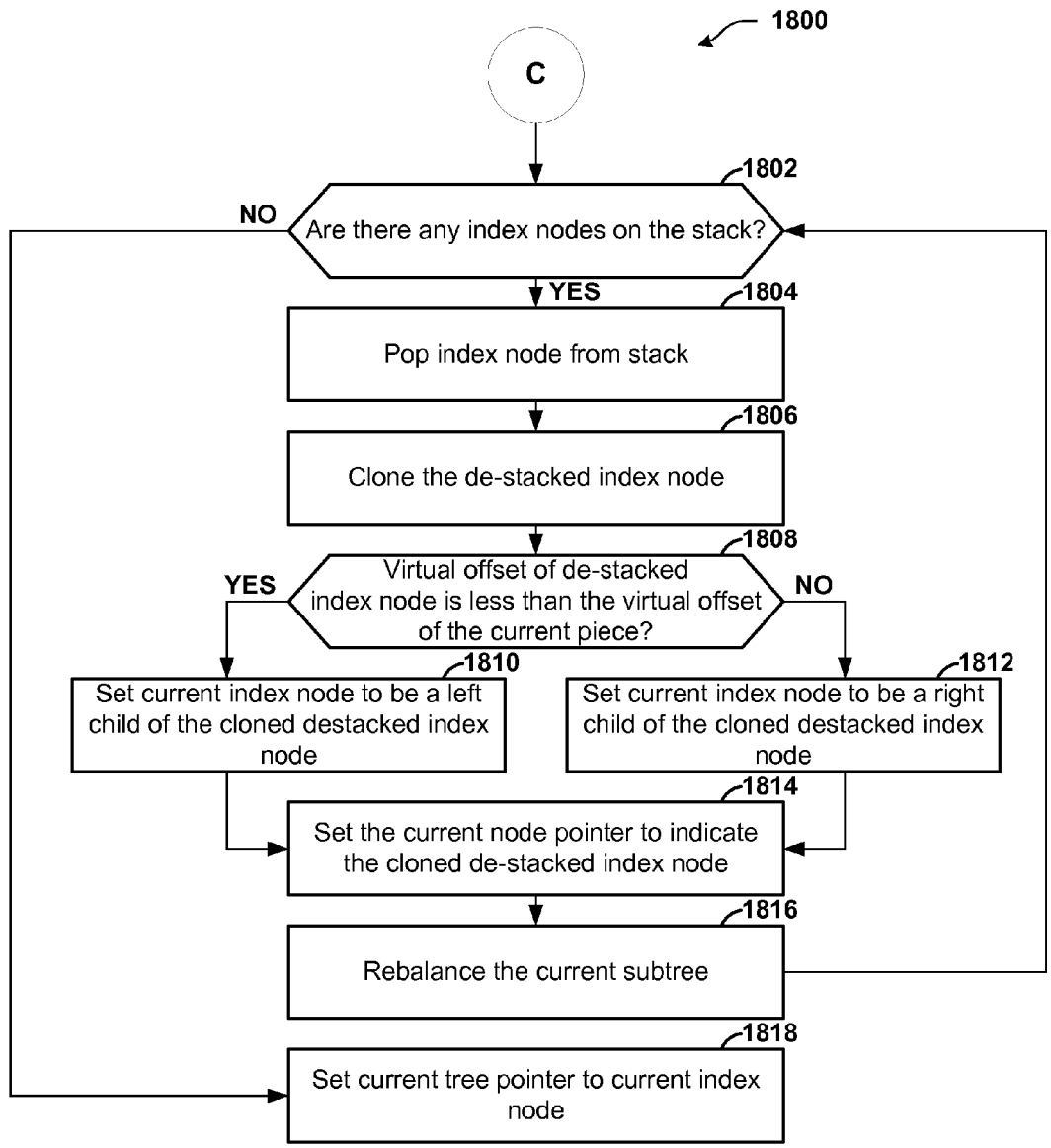
FIG. 18 is a flowchart illustrating an example operation of a reader thread.

FIG. 18 is a flowchart illustrating a further continuation 1800 of the element deletion operation 1400. As illustrated in the example of FIG. 18, the continuation 1800 begins when the builder thread 108 determines whether there are any index nodes on the stack (1802).

If there are any index nodes on the stack ("YES" of 1802), the builder thread 108 pops an index node from the stack (1804). The builder thread 108 then clones the de-stacked index node (1806). When the builder thread 108 clones the de-stacked index node, the builder thread 108 generates a new index node referred to herein as the cloned de-stacked index node. When the builder thread 108 clones the de-stacked index node, the left child attribute, the right child attribute, and the descriptor attribute of the cloned de-stacked index node have the same values as the left child attribute, the right child attribute, and the descriptor attribute of the de-stacked index node.

After cloning the de-stacked index node, the builder thread 108 determines whether the virtual offset of the piece associated with the de-stacked index node is less than the virtual offset of the piece associated with the current index node (1808). If the virtual offset of the piece associated with the de-stacked index node is less than the virtual offset of the piece associated with the current index node ("YES" of 1808), the builder thread 108 sets the left child attribute of the cloned de-stacked index node to indicate the current index node (1810). In this way, the current node becomes the left child of the cloned de-stacked index node.

Otherwise, if the virtual offset of the piece associated with the de-stacked index node is not less than (i.e., is greater than) the virtual offset of the piece associated with the current index node ("NO" of 1808), the builder thread 108 sets the right child attribute of the cloned de-stacked index node to indicate the current index node (1812). In this way, the current index node becomes the right child of the cloned de-stacked index node.

After setting the left or right child attributes of the cloned de-stacked index node, the builder thread 108 sets the current node pointer to indicate the cloned de-stacked index node (1814). In this way, the cloned de-stacked index node becomes the "current" index node. After setting the current node pointer to indicate the cloned de-stacked index node, the builder thread 108 again determines whether there are any index nodes on the stack (1802). If there are index nodes on the stack, the builder thread 108 repeats the steps 1804, 1806, 1808, 1810 or 1812, 1814, and 1816. Otherwise, if there are no index nodes on the stack, the builder thread 108 sets the current tree pointer to indicate the current index node (1818). After setting the current tree pointer to indicate the current index node, the element deletion operation 1400 is complete. Furthermore, after the builder thread 108 sets the current tree pointer, the active representation of the document 106 becomes the most recent available non-active representation of the document 106.

Figure 19:
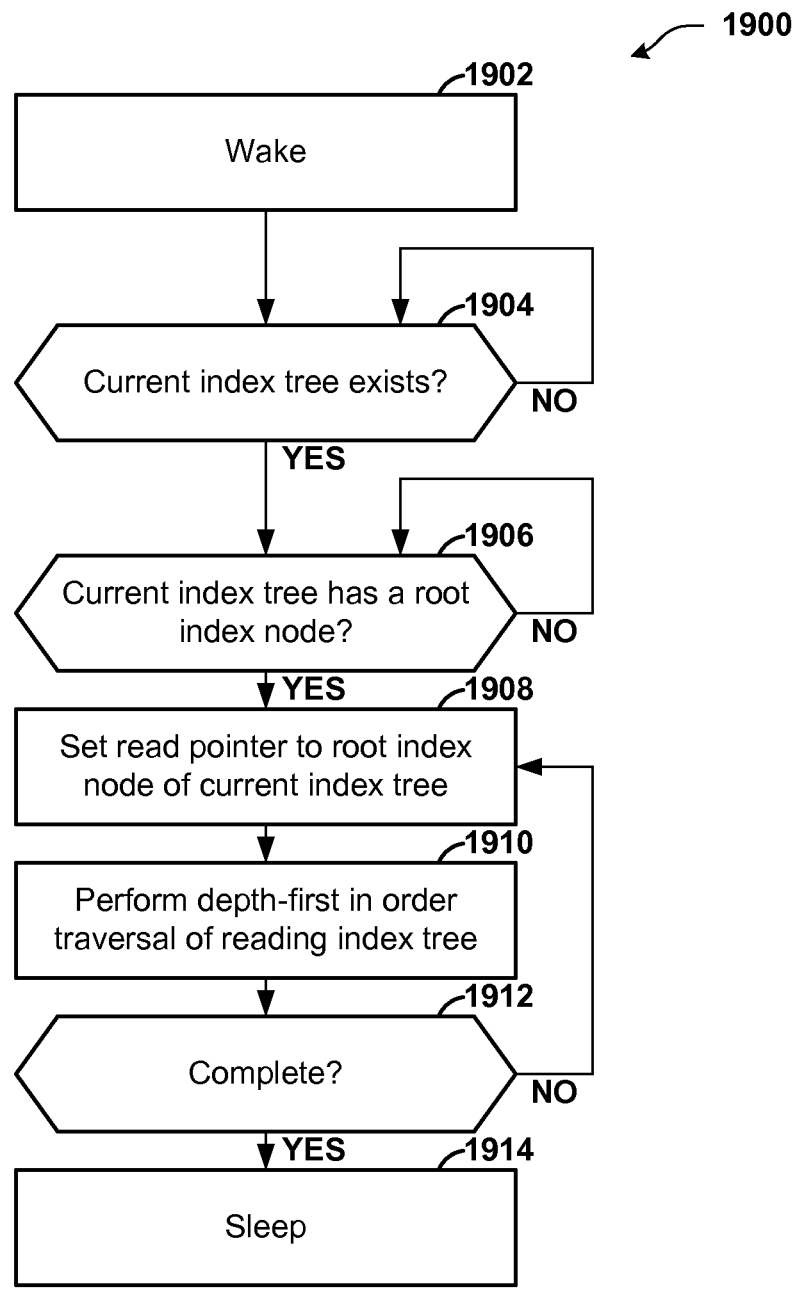
FIG. 19 is a flowchart illustrating an example operation of a reader thread.

FIG. 19 is a flowchart illustrating an example operation 1900 of the reader thread 110A. Although the operation 1900 is described with reference to the reader thread 110A, the operation 1900 can be performed by any of the reader threads 110.

The operation 1900 of the reader thread 110A begins when the application 104 wakes the reader thread 110A. When the reader thread 110A wakes, the reader thread 110A determines whether a current non-active index tree exists (1902). The current non-active index tree is the index tree indicated by the current tree pointer. Because the current tree pointer indicates the most recent available non-active version of the index tree, the current index tree is the most-recent available non-active version of the index tree. The reader thread 110A determines that the current index tree does not exist when the current tree pointer contains a null value. If the current index tree does not exist ("NO" of 1904), the reader thread 110A subsequently determines again whether the current index tree exists (1904). The reader thread 110A continues to determine whether the current index tree exists until the current index tree exists.

If the reader thread 110A determines that the current index tree exists ("YES" of 1904), the reader thread 110A determines whether the current index tree has a root index node (1906). In some embodiments, the current index tree is a software object that can contain index nodes. In such embodiments, the current index tree can exist when such a software object is instantiated, regardless of whether the software object contains any index nodes. If the current index tree does not have a root index node ("NO" of 1906), the reader thread 110A subsequently determines again whether the current index tree has a root index node (1906). The reader thread 110A continues to determine whether the current index tree has a root index node until the current index tree has a root index node.

If the current index tree has a root index node, the reader thread 110A sets a read pointer to indicate the root index node of the current index tree (1908). As used herein, the root reading node is the index node indicated by the read pointer. The reader thread 110A then performs a depth-first in-order traversal of the index nodes in the reading index tree (1910). The reading index tree is the index tree of which the root reading node is the root. As the reader thread 110A traverses the index nodes in the reading index tree, the reader thread 110A can perform various actions on the elements associated with the index nodes. For example, the reader thread 110A can perform a spell check operation that checks the spellings of words in the elements associated with the index nodes. In another example, the reader thread 110A can update a search index based on words in the elements associated with the index nodes. In yet another example, the reader thread 110A can write (e.g., save) the elements to a local or remote storage location. Because the reader thread 110A can operate concurrently with the builder thread 108, the user 102 might not sense any delay or slowdown in the performance of the builder thread 108 due to the operation of the reader thread 110A.

After performing a complete traversal of index nodes in the reading index tree, the reader thread 110A determines whether the operation of the reader thread 110A is complete (1912). If the operation of the reader thread 110A is complete ("YES" of 1912), the reader thread 110A sleeps (1914).

Otherwise, if the operation of the reader thread 110A is not complete ("NO" of 1912), the reader thread 110A sets the read pointer to indicate the root index node of the current index tree (1908). As the reader thread 110A is traversing the index nodes in the reading index tree, the builder thread 108 can be executing concurrently, performing element insertion and/or element deletion operations. Because the builder thread 108 does not change the attributes of any index node in the reading index tree, logical consistency of read operations from the reading index tree are ensured. However, the builder thread 108 can update the current tree pointer to indicate another index tree. Hence, when the reader thread 110A sets the read pointer to indicate the root index node of the current index tree, the current index tree can be a different index tree than the reading index tree that the reader thread 110A just traversed. In this way, the reader thread 110A starts traversing the most current index tree.

Figure 20:
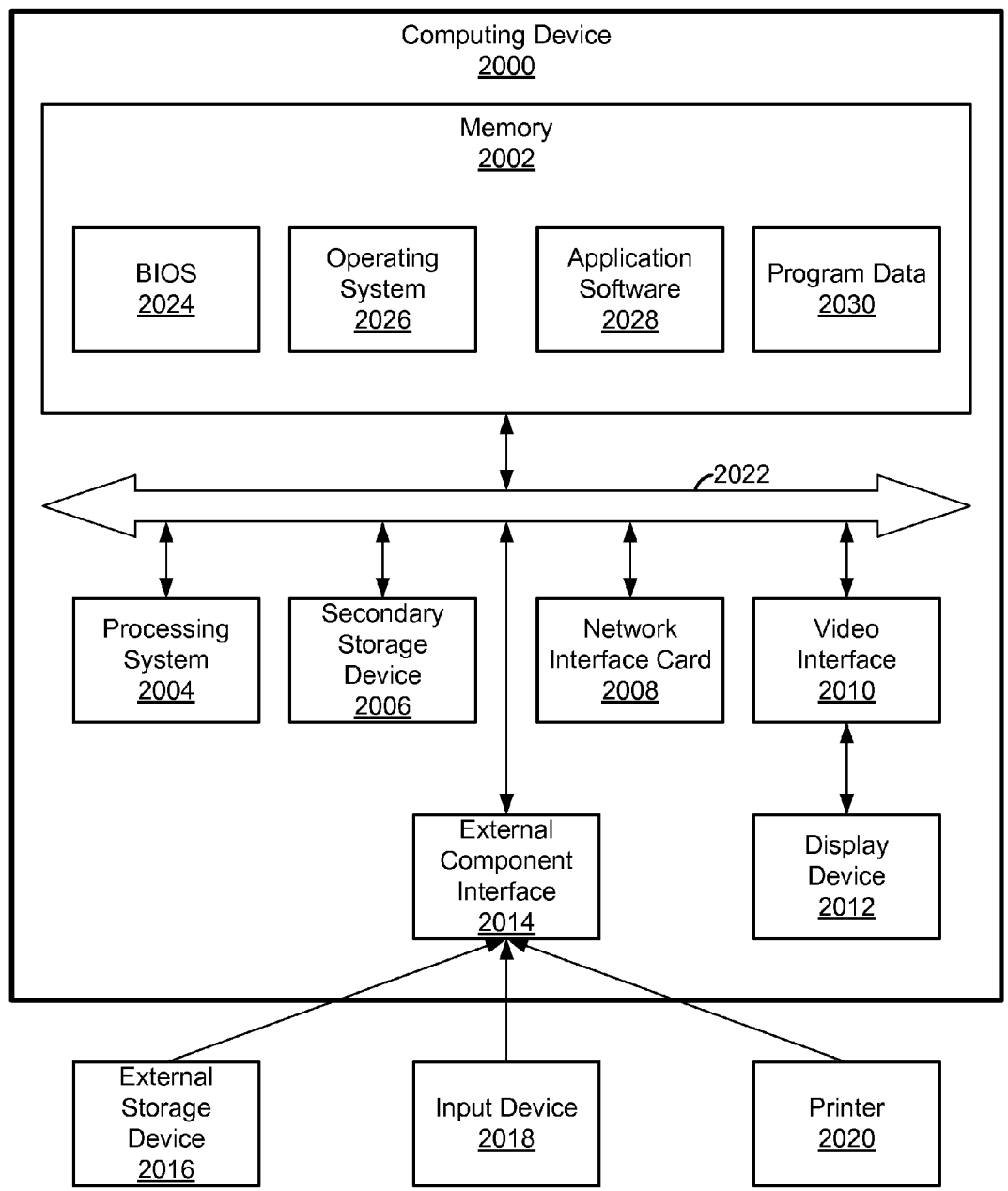
FIG. 20 is a block diagram illustrating an example computing device.

FIG. 20 is a block diagram illustrating an example computing device 2000. In some embodiments, the computing system 100 is implemented using one or more computing devices like the computing device 2000. It should be appreciated that in other embodiments, the computing system 100 is implemented using computing devices having hardware components other than those illustrated in the example of FIG. 20.

A computing system is a system comprising one or more computing devices. A computing device is a physical device that is capable of processing information. Example types of computing devices include desktop computers, laptop computers, standalone server computers, blade server computers, mobile telephones, personal media players, video game consoles, computers integrated into vehicles, television set top boxes, intermediate network devices, and other types of physical devices that are capable of processing information.

In different embodiments, computing devices are implemented in different ways. For instance, in the example of FIG. 20, the computing device 2000 comprises a memory 2002, a processing system 2004, a secondary storage device 2006, a network interface card 2008, a video interface 2010, a display device 2012, an external component interface 2014, an external storage device 2016, an input device 2018, a printer 2020, and a communication medium 2022. In other embodiments, computing devices are implemented using more or fewer hardware components. For instance, in another example embodiment, a computing device does not include a video interface, a display device, an external storage device, or an input device.

The memory 2002 is a data storage system. A data storage system is a system comprising one or more computer-readable data storage media. A computer-readable data storage medium is a tangible device or article of manufacture that stores data and/or computer executable instructions readable by a computing device. In different embodiments, the memory 2002 is implemented in different ways. For instance, in various embodiments, the memory 2002 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system 2004 is a system comprising one or more processing units. Processing units include one or more physical integrated circuits that selectively execute software instructions. In various embodiments, the processing system 2004 is implemented in various ways. For instance, in one example embodiment, the processing system 2004 is implemented as one or more processing cores. For instance, in this example embodiment, the processing system 2004 may be implemented as one or more Intel Core 2 microprocessors. In another example embodiment, the processing system 2004 is implemented as one or more separate microprocessors. In yet another example embodiment, the processing system 2004 is implemented as an ASIC that provides specific functionality. In yet another example embodiment, the processing system 2004 provides specific functionality by using an ASIC and by executing software instructions.

In different embodiments, the processing system 2004 executes software instructions in different instruction sets. For instance, in various embodiments, the processing system 2004 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 2006 includes one or more computer-readable data storage media. The secondary storage device 2006 stores data and software instructions not directly accessible by the processing system 2004. In other words, the processing system 2004 performs an I/O operation to retrieve data and/or software instructions from the secondary storage device 2006. In various embodiments, the secondary storage device 2006 is implemented by various types of computer-readable data storage media. For instance, the secondary storage device 2006 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 2008 enables the computing device 2000 to send data to and receive data from a computer communication network. In different embodiments, the network interface card 2008 is implemented in different ways. For example, in various embodiments, the network interface card 2008 is implemented as an Ethernet interface, a token-ring network interface, a fiber optic network interface, a wireless network interface (e.g., WiFi, WiMax, etc.), or another type of network interface.

The video interface 2010 enables the computing device 2000 to output video information to the display device 2012. In different embodiments, the video interface 2010 is implemented in different ways. For instance, in one example embodiment, the video interface 2010 is integrated into a motherboard of the computing device 2000. In another example embodiment, the video interface 2010 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 2012 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 2010 communicates with the display device 2012 in various ways. For instance, in various embodiments, the video interface 2010 communicates with the display device 2012 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 2014 enables the computing device 2000 to communicate with external devices. In various embodiments, the external component interface 2014 is implemented in different ways. For instance, in one example embodiment, the external component interface 2014 is a USB interface. In other example embodiments, the computing device 2000 is a FireWire interface, a serial port interface, a parallel port interface, a PS/2 interface, and/or another type of interface that enables the computing device 2000 to communicate with external components.

In different embodiments, the external component interface 2014 enables the computing device 2000 to communicate with different external components. For instance, in the example of FIG. 20, the external component interface 2014 enables the computing device 2000 to communicate with the external storage device 2016, the input device 2018, and the printer 2020. In other embodiments, the external component interface 2014 enables the computing device 2000 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 2000.

The external storage device 2016 is an external component comprising one or more computer readable data storage media. Different implementations of the computing device 2000 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 2018 is an external component that provides user input to the computing device 2000. Different implementations of the computing device 2000 interface with different types of input devices. Example types of input devices include, but are not limited to, keyboards, mice, trackballs, stylus input devices, key pads, microphones, joysticks, touch-sensitive display screens, and other types of devices that provide user input to the computing device 2000. The printer 2020 is an external device that prints data to paper. Different implementations of the computing device 2000 interface with different types of printers. Example types of printers include, but are not limited to laser printers, ink jet printers, photo printers, copy machines, fax machines, receipt printers, dot matrix printers, or other types of devices that print data to paper.

The communications medium 2022 facilitates communication among the hardware components of the computing device 2000. In different embodiments, the communications medium 2022 facilitates communication among different components of the computing device 2000. For instance, in the example of FIG. 20, the communications medium 2022 facilitates communication among the memory 2002, the processing system 2004, the secondary storage device 2006, the network interface card 2008, the video interface 2010, and the external component interface 2014. In different implementations of the computing device 2000, the communications medium 2022 is implemented in different ways. For instance, in different implementations of the computing device 2000, the communications medium 2022 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 2002 stores various types of data and/or software instructions. For instance, in the example of FIG. 20, the memory 2002 stores a Basic Input/Output System (BIOS) 2024, an operating system 2026, application software 2028, and program data 2030. The BIOS 2024 includes a set of software instructions that, when executed by the processing system 2004, cause the computing device 2000 to boot up. The operating system 2026 includes a set of software instructions that, when executed by the processing system 2004, cause the computing device 2000 to provide an operating system that coordinates the activities and sharing of resources of the computing device 2000. Example types of operating systems include, but are not limited to, MICROSOFT® WINDOWS®, Linux, Unix, Apple OS X, Apple OS X iPhone, Palm webOS, Palm OS, Google Chrome OS, Google Android OS, and so on. The application software 1928 includes a set of software instructions that, when executed by the processing system 2004, cause the computing device 2000 to provide applications to a user of the computing device 2000. The program data 2030 is data generated and/or used by the application software 2028.

The various embodiments described above are provided by way of illustration only and should not be construed as limiting. Those skilled in the art will readily recognize various modifications and changes that may be made without following the example embodiments and applications illustrated and described herein. For example, the embodiments have been described with regard to a document. However, other embodiments apply the techniques described in this specification to other types of hierarchical data structures. Furthermore, the operations shown in the figures are merely examples. In various embodiments, similar operations can include more or fewer steps than those shown in the figures. Furthermore, in other embodiments, similar operations can include the steps of the operations shown in the figures in different orders.

I claim:

1. A method comprising:
providing a non-active representation of a document, the non-active representation of the document comprising a piece descriptor and a piece descriptor index;
executing, by a computing system, a builder thread to input or modify an element in the document, the builder thread creating a new piece descriptor for indicating a position where the element belongs in the document, the new piece descriptor and the piece descriptor index forming an active representation of the document, wherein the active representation of the document and the non-active representation of the document refer to the same data stored in memory;
providing access to the non-active representation for use by a reader thread while the builder thread modifies the active representation of the document;
after the builder thread modifies the document, updating the non-active representation of the document with the active representation of the document, such that modifications to the element at the position indicated by the new piece descriptor replaces a corresponding element at the position indicated by the piece descriptor in the non-active representation of the document; and
after updating the non-active representation, providing access to the non-active representation of the document including the modifications to the element.

2. The method of claim 1, wherein the operation performed by the reader thread does not modify the document.

3. The method of claim 2,
wherein the builder thread performs an operation that creates a new representation of the document each time the builder thread receives input to modify the document; and
wherein after the builder thread completes the operation, the new representation of the document is available for use by the reader thread.

4. The method of claim 1, further comprising executing, by the computing system, another reader thread concurrently with the reader thread and the builder thread, the other reader thread performing another operation regarding the document using the non-active representation of the document.

5. The method of claim 1, further comprising: executing, by the computing system, an application that enables a user to interact with the document, the application waking the builder thread and the reader thread.

6. The method of claim 5,
wherein the application is a word processing application and the document is a word processor document; and
wherein the operation performed by the reader thread is a spell check operation.

7. The method of claim 1,
wherein the document is internally represented as a document tree, the document tree being a hierarchy of document elements;
wherein the active representation of the document includes a real element array that contains elements that represent each document element in the document tree;
wherein the non-active representation of the document includes the real element array;
wherein the active representation of the document and the non-active representation of the document do not include different copies in the memory of the same elements in the real element array.

8. The method of claim 7, wherein the builder thread removes a given element from the active representation of the document while concurrently the reader thread reads the given element from the non-active representation of the document, the given element representing the same document element in the document tree.

9. The method of claim 7,
wherein the active representation of the document includes an active version of an index tree and an active version of a piece descriptor table, the piece descriptor table comprising a set of piece descriptors, each of the piece descriptors identifying a piece of the real element array, the index tree comprising a hierarchy of index nodes, each of the index nodes indicating one of the piece descriptors;
wherein the non-active representation of the document includes a non-active version of the index tree and a non-active version of the piece descriptor table;
wherein for each index node in the index tree, elements associated with index nodes in a left subtree of the index node have virtual offsets that are less than virtual offsets of elements associated with the index node and elements associated with index nodes in a right subtree of the index node have virtual offsets that are greater than the virtual offsets of the elements associated with the index node, the virtual offsets being offsets from a beginning of a virtual element array, the virtual element array being a one-dimension representation of the document tree;
wherein the active representation of the document and the non-active representation of the document do not have in the memory different copies of the same piece descriptors in the piece descriptor table or the same index nodes in the index tree.

10. The method of claim 9, wherein data in the index nodes in the non-active version of the index tree and data in the non-active version of the piece descriptor table do not change.

11. The method of claim 9,
wherein to modify the document to include an additional document element, the builder thread performs an element insertion operation that generates the active representation of the document by inserting one or more new elements into the real element array, adding a new piece descriptor to the piece descriptor table, and adding one or more new index nodes to the index tree, the one or more new elements representing the additional document element;
wherein after the builder thread completes the element insertion operation, the active representation of the document becomes available for use by the reader thread.

12. The method of claim 1, wherein parts of the document within the active representation of the document and the non-active representation of the document that are the same refer to a same copy of the data.

13. A computing system comprising:
a processing system comprising a plurality of processing units; and
a memory that comprises computer executable instructions that, when executed by the processing system, cause the computing system to:
provide a non-active representation of a document, the non-active representation of the document comprising a piece descriptor and a piece descriptor index;
execute a builder thread that modifies an element in a document by modifying an active representation of the document, the builder thread creating a new piece descriptor to indicate a position where the element belongs in the document, the new piece descriptor and the piece descriptor index forming an active representation of the document, wherein the active representation of the document and the non-active representation of the document refer to the same data stored in memory;
provide access to the non-active representation for use by a reader thread while the builder thread modifies the active representation of the document;
update the non-active representation of the document with the active representation of the document, such that modifications to the element at the position indicated by the new piece descriptor replaces a corresponding element at the position indicated by the piece descriptor in the non-active representation of the document; and
after updating the non-active representation, providing access to the non-active representation of the document including the modifications to the element.

14. The computing system of claim 13,
wherein the builder thread performs an operation that generates a new active representation of the document each time the builder thread receives input to modify the document; and
wherein after the builder thread completes the operation, the new active representation of the document becomes a non-active representation of the document that is available for use by the reader thread.

15. The computing system of claim 13, wherein the memory stores an application that, when executed by the processing system, enables a user to interact with the document, the application waking the builder thread and the reader thread.

16. The computing system of claim 13,
wherein the document is internally represented as a document tree, the document tree being a hierarchy of document elements;
wherein the active representation of the document includes a real element array that contains elements that represent each document element in the document tree;
wherein the non-active representation of the document includes the real element array;

wherein the active representation of the document and the non-active representation of the document do not include different copies in the memory of the same elements in the real element array.

17. The computing system of claim 16,
wherein the active representation of the document includes an active version of an index tree and an active version of a piece descriptor table, the piece descriptor table comprising a set of piece descriptors, each of the piece descriptors identifying a piece of the real element array, the index tree comprising a hierarchy of index nodes, each of the index nodes indicating one of the piece descriptors;
wherein the non-active representation of the document includes a non-active version of the index tree and a non-active version of the piece descriptor table;
wherein for each index node in the index tree, elements associated with index nodes in a left subtree of the index node have virtual offsets that are less than virtual offsets of elements associated with the index node and elements associated with index nodes in a right subtree of the index node have virtual offsets that are greater than the virtual offsets of the elements associated with the index node, the virtual offsets being offsets from a beginning of a virtual element array, the virtual element array being a one-dimension representation of the document tree;
wherein the active representation of the document and the non-active representation of the document do not have in the memory different copies of the same piece descriptors in the piece descriptor table or the same index nodes in the index tree.

18. The computing system of claim 17, wherein data in the index nodes in the non-active version of the index tree and data in the non-active version of the piece descriptor table do not change.

19. The computing system of claim 17, wherein to add a new index node to the index tree when the new index node is to be in a left subtree of another index node in the index tree, the builder thread adds the new index node and one or more replacement index nodes to the active version of the index tree, the one or more replacement index nodes replacing all ancestors in the index tree of new index node.

20. A data storage medium that stores computer-readable instructions that, when executed, cause a computing system to:

execute an application that enables a user to interact with a document, the document being internally represented as a document tree, the document tree comprising a hierarchy of document elements, the application waking a builder thread and a reader thread;
execute the builder thread, the builder thread modifying the document by modifying an active representation of the document, the active representation of the document stored in a memory, the active representation of the document including an active version of an index tree, an active version of a piece descriptor table, and a real element array, the real element array containing elements that represent each document element in the document tree, the piece descriptor table comprising a set of piece descriptors, each of the piece descriptors identifying a piece of the real element array, the index tree comprising a hierarchy of index nodes, each of the index nodes indicating one of the piece descriptors; and
execute the reader thread concurrently with the builder thread, the reader thread performing an operation regarding the document using a non-active representation of the document, the non-active representation of the document including a non-active version of the index tree, a non-active version of the piece descriptor table, and the real element array, the non-active representation of the document stored in the memory, the active representation of the document and the non-active representation of the document not including different copies in the memory of the same data, wherein when reading data in the non-active representation of the document, logical consistency is ensured without locking any data in the non-active representation of the document, the operation of the reader thread not modifying the document,
wherein for each index node in the index tree, elements associated with index nodes in a left subtree of the index node have virtual offsets that are less than virtual offsets of elements associated with the index node and elements associated with index nodes in a right subtree of the index node have virtual offsets that are greater than the virtual offsets of the elements associated with the index node, the virtual offsets being offsets from a beginning of a virtual element array, the virtual element array being a one-dimension representation of the document tree.

* * * * *